June 22, 1926.

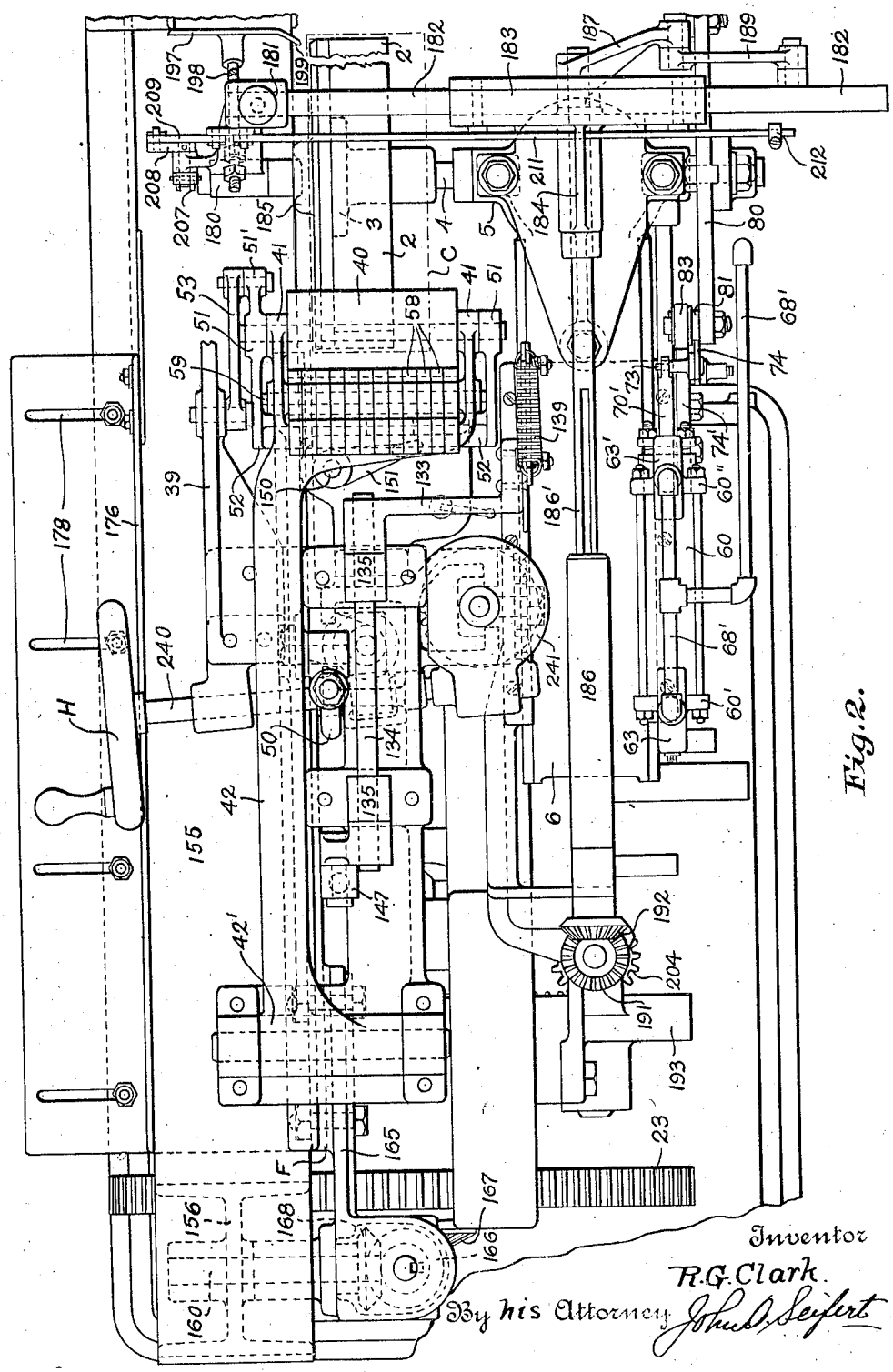

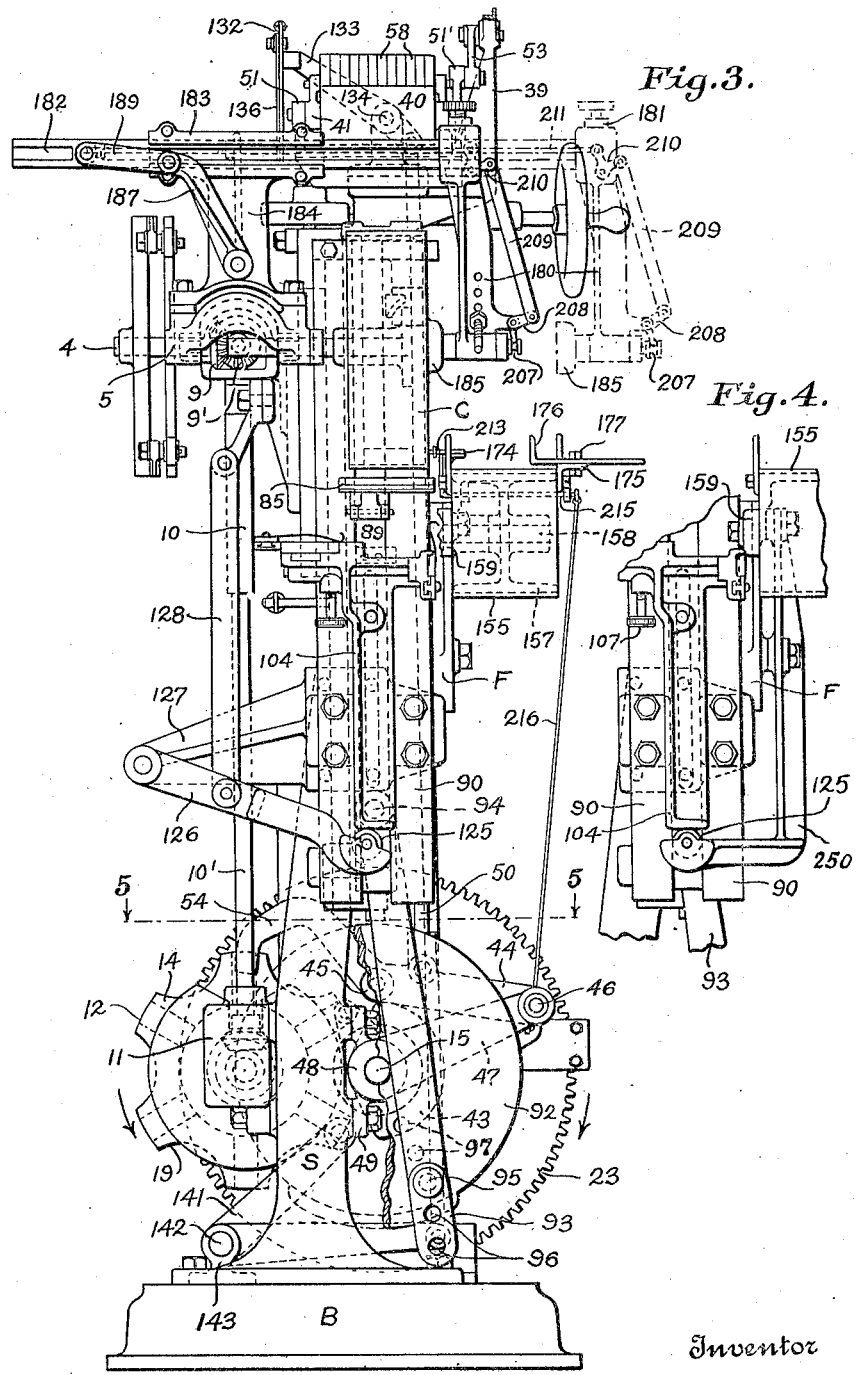

R. G. CLARK

BOX COVERING APPARATUS

Filed April 24, 1924    11 Sheets-Sheet 4

1,589,586

Inventor
R. G. Clark
By his Attorney

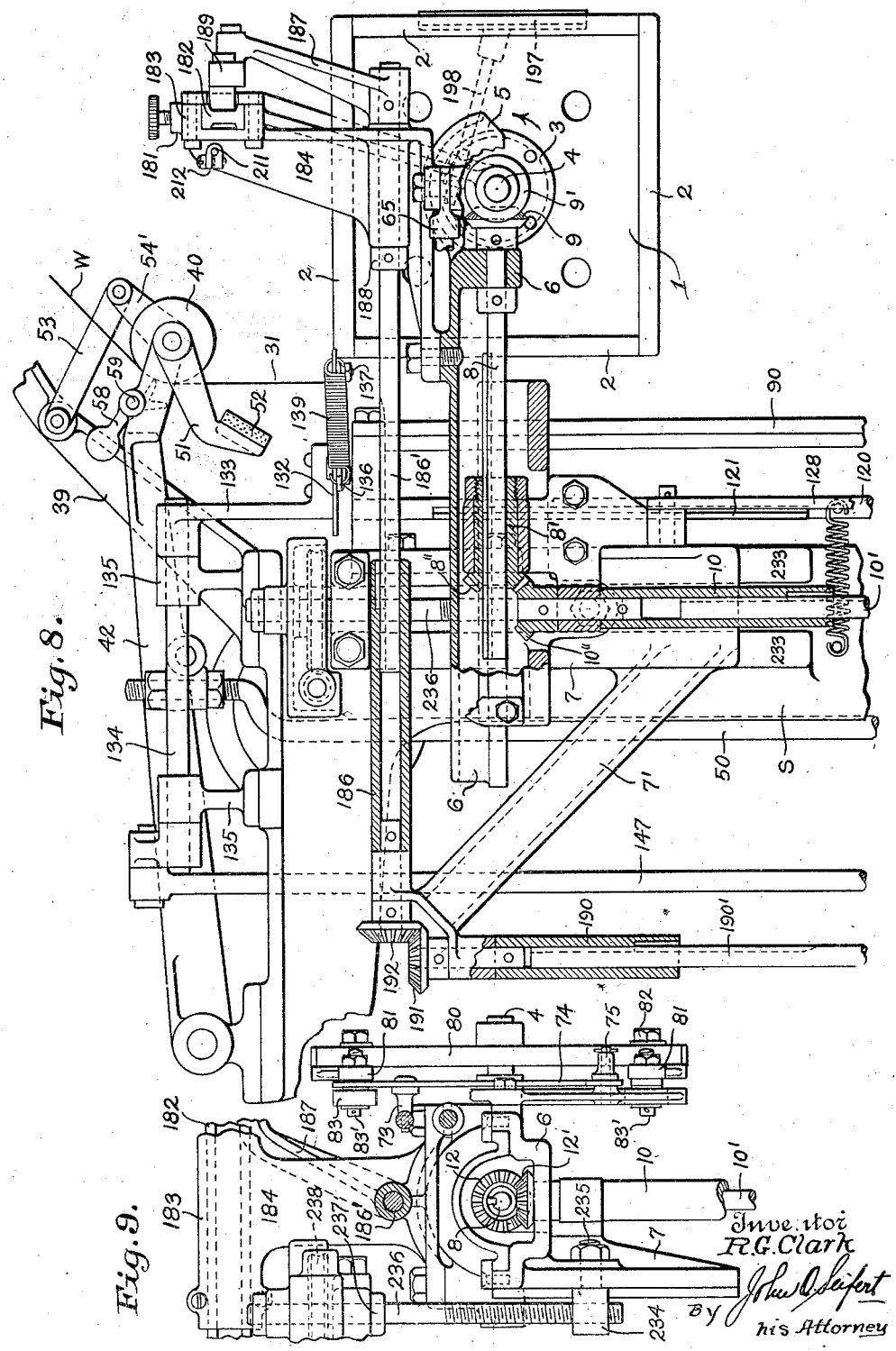

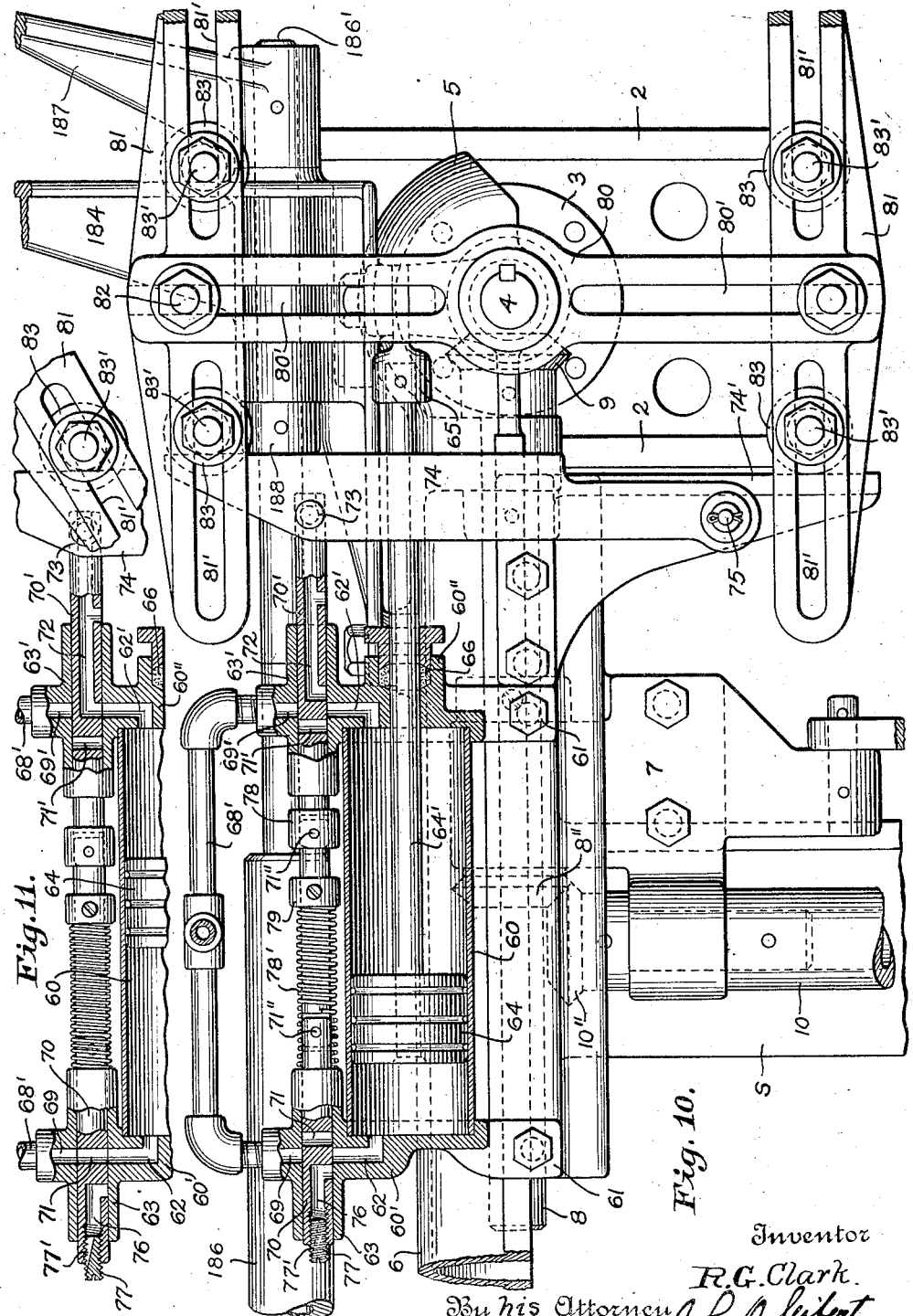

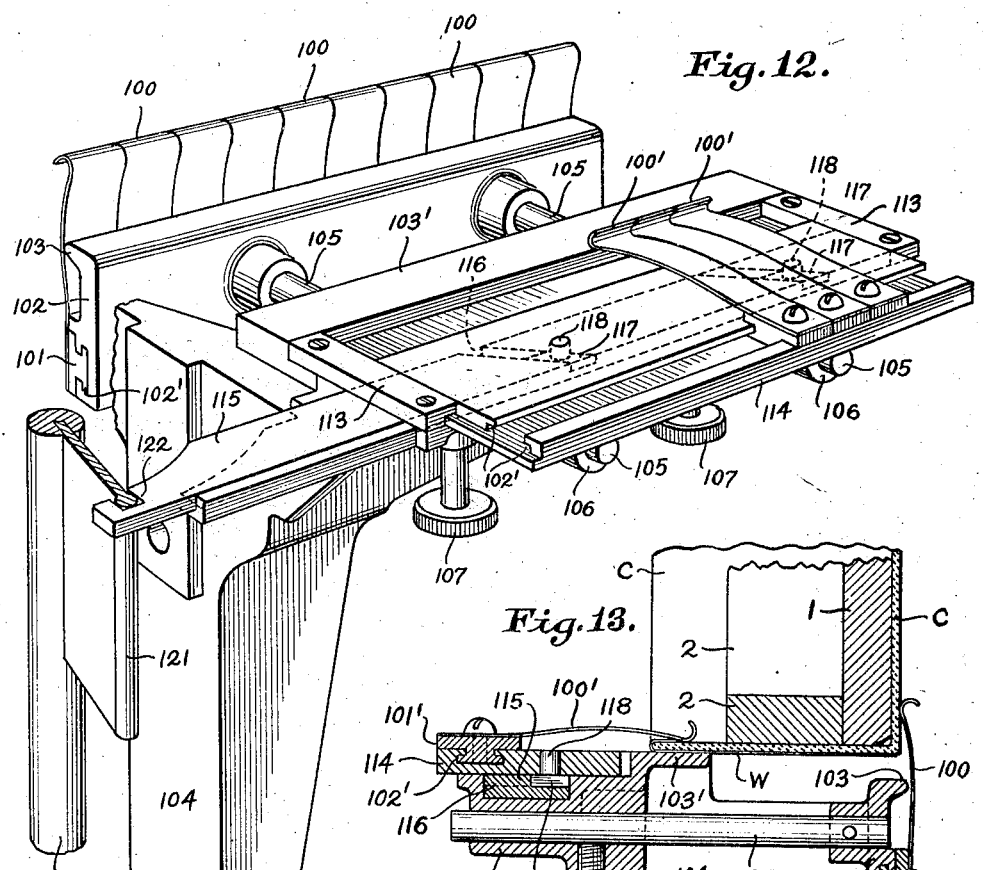

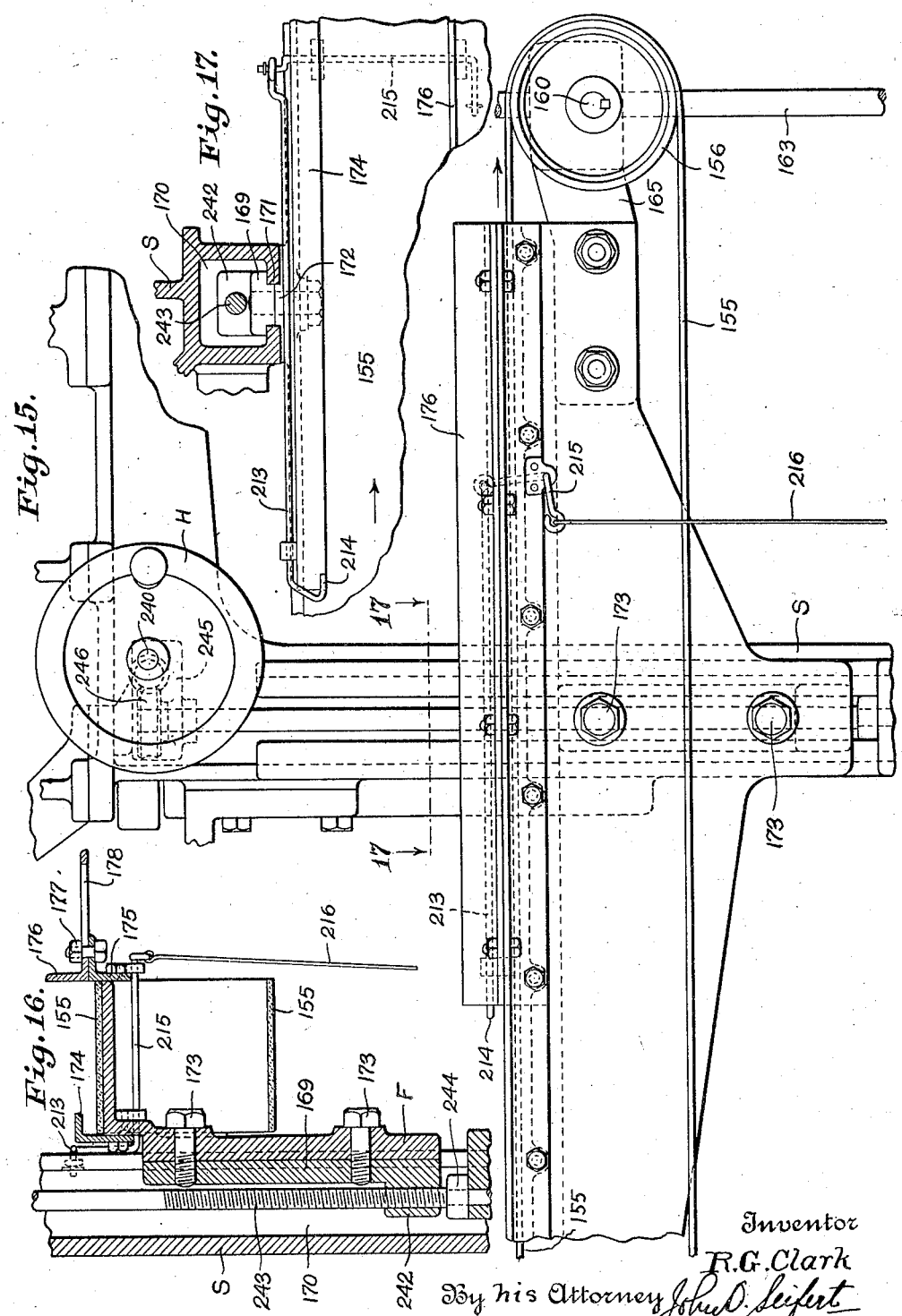

June 22, 1926.

R. G. CLARK 1,589,586

BOX COVERING APPARATUS

Filed April 24, 1924 11 Sheets-Sheet 9

Inventor
R. G. Clark.
By his Attorney John D. Seifert

June 22, 1926.
R. G. CLARK
BOX COVERING APPARATUS
Filed April 24, 1924    11 Sheets-Sheet 10
1,589,586
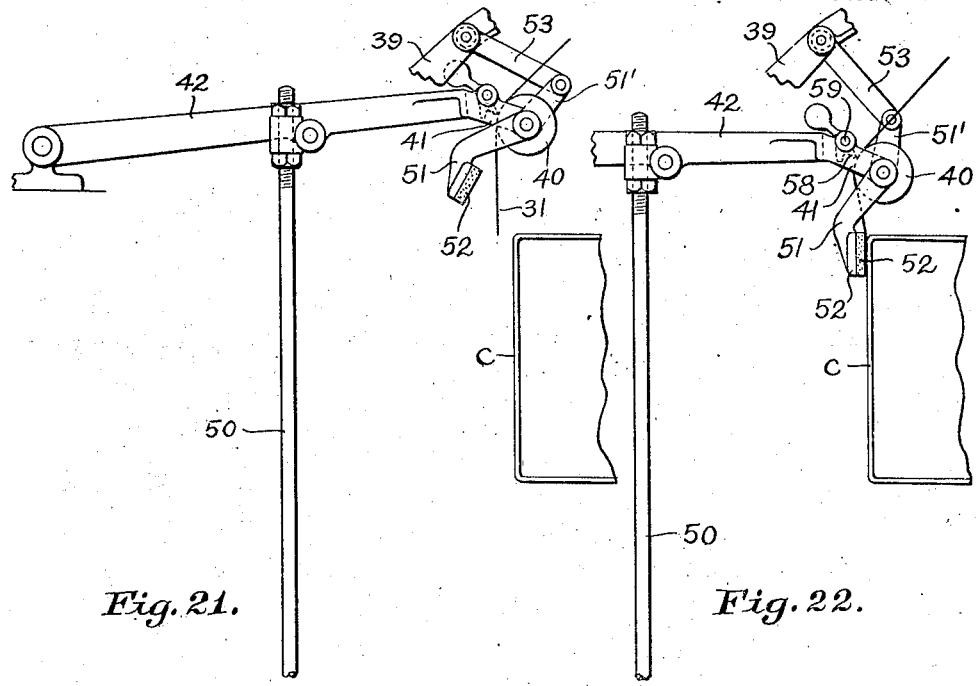
Fig. 21.      Fig. 22.
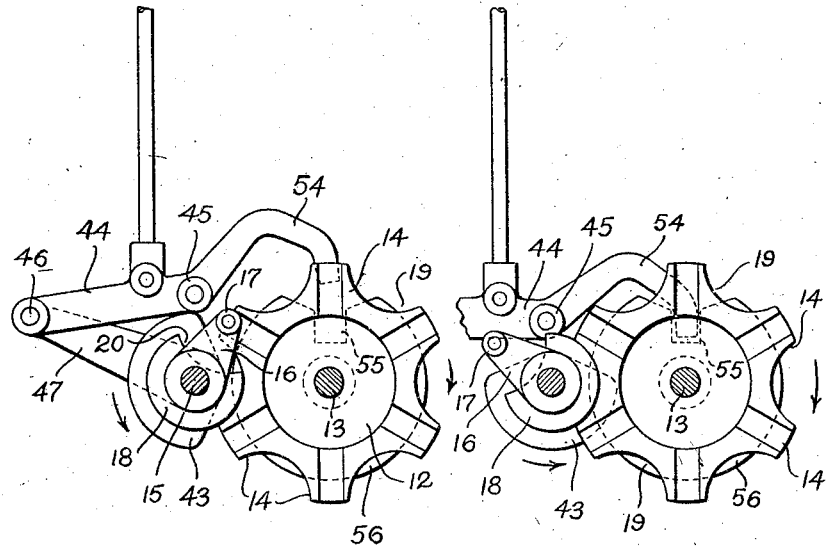
Inventor
R. G. Clark.
By his Attorney June 22, 1926.

R. G. CLARK

BOX COVERING APPARATUS

Filed April 24, 1924   11 Sheets-Sheet 11

1,589,586

Inventor
R.G.Clark
By his Attorney

Patented June 22, 1926.

1,589,586

UNITED STATES PATENT OFFICE.

ROBERT G. CLARK, OF BROOKLYN, NEW YORK, ASSIGNOR TO LIBERTY AUTOMATIC PAPER BOX MACHINE CORPORATION, OF BROOKLYN, NEW YORK, A CORPORATION OF NEW YORK.

BOX-COVERING APPARATUS.

Application filed April 24, 1924. Serial No. 708,763.

This invention relates to apparatus for covering boxes of cardboard or the like to embellish and enhance the appearance thereof, which is commonly known as "stripping apparatus" in which a gummed web or strip is applied to the outer side of the box, and it is a primary object of the invention to provide a machine of this character which is simple, compact, cheap in structure and efficient in use.

It is the principal object of the invention to provide apparatus for this purpose in which the operations are entirely automatic wherein the boxes placed on a conveyor are positioned relative to a rotatable support and transferred from the conveyor to the support when mechanism is set in operation to apply the leading end portion of a gummed covering web to a side of a box on the support when the box support is intermittently rotated and during such rotation the web wrapped around the sides of the box, means being provided relative to which the sides of the box with the web are successively positioned during the periods or intervals of rest to press the web against the side of the box, and after a predetermined number of rotative movements have been imparted to the support with the box thereon means are actuated to sever the web after which the box transferring means is again operative to transfer the covered box from the support and reposition it on the conveyor when the operations are repeated.

In the covering of boxes a web is utilized of a width greater than the depth of the box and positioned so that lateral portions of the web will extend beyond the bottom and edges of the sides at the open end which lateral portions are folded over the side edges and against the bottom. In box covering and stripping machines it is the practice to apply the covering web or strip to the sides of the box as it is urged with its support with the lateral portions of the covering web extending beyond the edges at the open end and bottom of the box when the box is removed from its support and said lateral portions of the web manually folded against the bottom and over the edges of the box, and it is a further object of the invention to provide means in box covering apparatus relative to which the sides of the box with the covering web are successively presented and operative concomitantly with the pressing of the web against the side of the box to fold the extended lateral portions of the web against the bottom and over the edge at the open end of the box.

It is a further object of the invention to provide box covering or stripping apparatus which is adjustable to adapt the same to the covering of boxes of variable sizes.

Other objects and advantages will hereinafter appear.

In the drawings accompanying and forming a part of this specification Figure 1 is a side elevation of a box covering apparatus illustrating an embodiment of my invention.

Figure 2 is a plan view with a portion broken away.

Figure 3 is a front elevation looking at the right of Figure 1.

Figure 4 is a detail view in end elevation of modified means to limit the movement of an elevator carrying means for folding the lateral portions of the web against the bottom and over the edges at the open end of a box.

Figure 8 is an enlarged view on side elevation of the upper portion of the apparatus, partly in section, to illustrate the driving means for the box support rotating means and the box transferring means as well as the means to position and apply the leading end portion of a covering web or strip to a box on the support.

Figure 9 is a detail view, partly in section, looking at the lefthand end of Figure 8 to illustrate the driving means for the box support, guiding means therefor and the box transferring means, and also a part of the means for adjusting the apparatus to adapt the same to boxes of different sizes.

Figure 10 is a side elevation, partly in section and on an enlarged scale, of fluid actuated means operative during the rotative movements of the box support to impart reciprocatory movement to the support concomitant with the rotative movements of the support.

Figure 11 is a longitudinal sectional detail view of control means for the fluid actuated means shown in Figure 10.

Figure 12 is an enlarged view in perspective of an elevator carrying means to fold the lateral portions of the covering web on the box support against the bottom and over the edges of the sides at the open end of the box.

Figure 13 is a cross sectional view of the means shown in Figure 12 to fold the lateral portions of the covering web against the bottom and over the edges of the box at the open end and showing the folding means in operative relation to a box on the support.

Figure 14 is a perspective view of an actuator to move the means to fold the lateral portion of the web over the edges at the open end of the box.

Figure 15 is a side elevation of the conveyor on an enlarged scale showing the means to mount and adjust the same.

Figure 16 is a longitudinal sectional view to show the adjustable mounting on the conveyor.

Figure 17 is a sectional view taken on the line 17—17 of Figure 15 looking in the direction of the arrows to show stop means engaged by a box on the conveyor and thereby to set the box transferring means in motion to transfer a box from the conveyor to the support.

Figure 18:
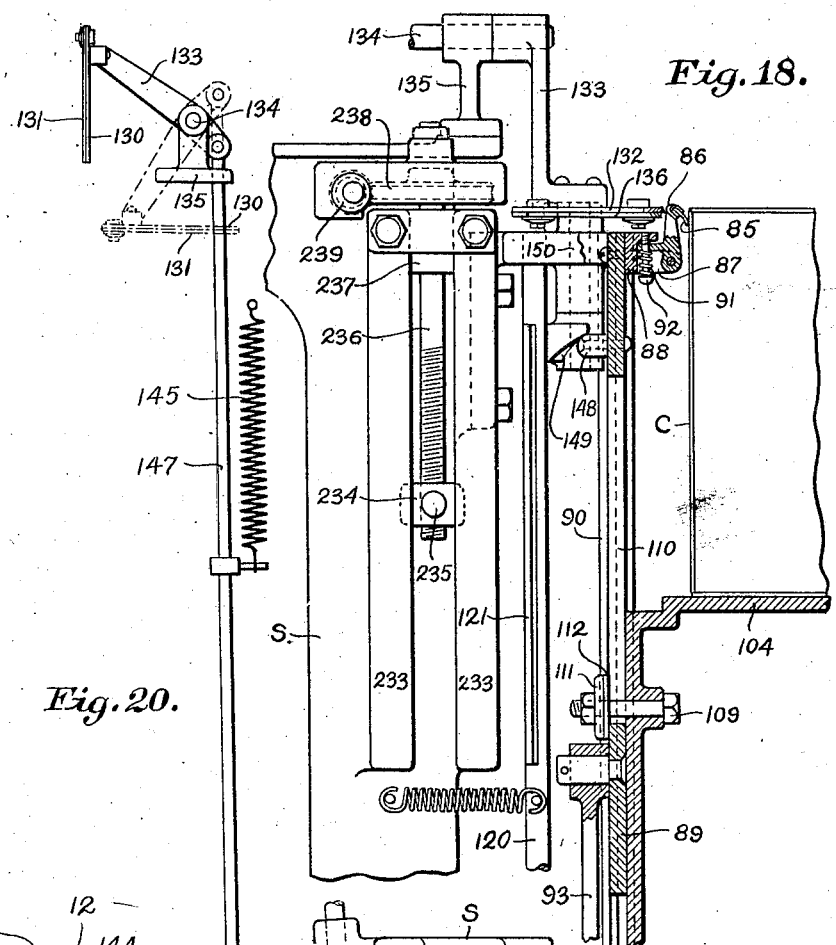

Figure 18 is a longitudinal sectional view to show the mounting of a wiper to press the web against the side of a box during the periods of rest of the box support together with its actuating means, and the elevator carrying means to fold the lateral portions of the web against the bottom and over the edge at the open end of a box and showing said web pressing and folding means in relation to a box, said view also illustrating cutter mechanism for severing the covering web and actuating means for said cutter mechanism operative from the wiper actuating means, together with the adjustable mounting for the box support.

Figure 19:
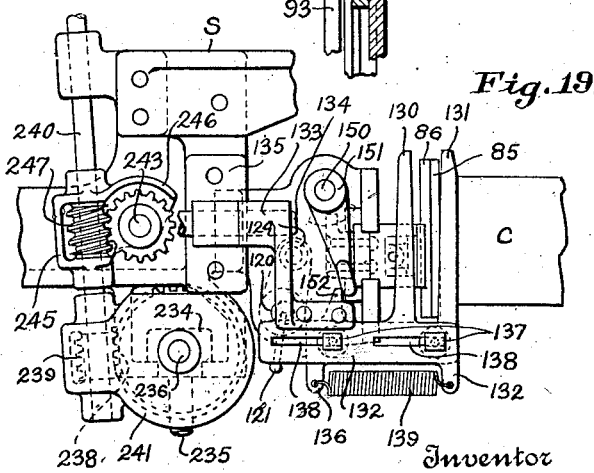

Figure 19 is a view looking at the top of Figure 18 to show the web severing mechanism in operative position to sever the web and its actuating means, together with the means for adjusting the apparatus to adapt the same to the covering of boxes of different sizes.

Figure 20:
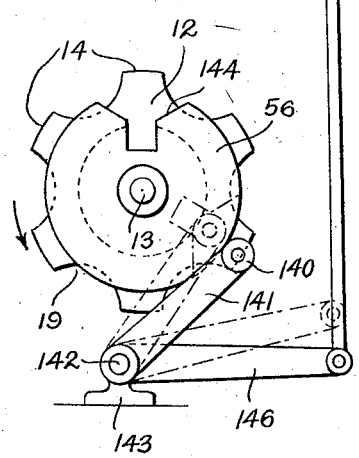

Figure 20 is an elevational view of the cutter mechanism and its actuating means.

Figure 21 is an elevational view of the means to support, position and apply the leading end portion of a covering web to a box and its actuating means showing the same in normal inoperative position.

Figure 22 is a view similar to Figure 21 to show the positions the parts will assume when applying the leading end portion of a web to the side of the box.

Figures 23 to 28 inclusive are perspective views of a box showing the successive or cycle of operations of applying the leading end portion of the covering web to the side of the box, wrapping the web around the sides of the box as it is intermittently rotated, pressing the web to the sides of the box and folding the lateral portions of the web against the bottom and over the edge at the open end of the box, and the severing of the web.

Figure 29:
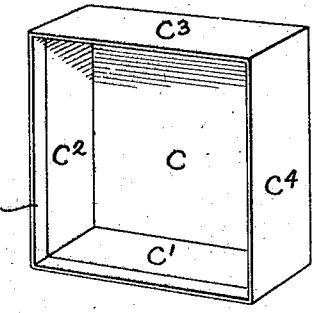

Figure 29 is a perspective view looking at the open end of a covered box.

Figure 30:
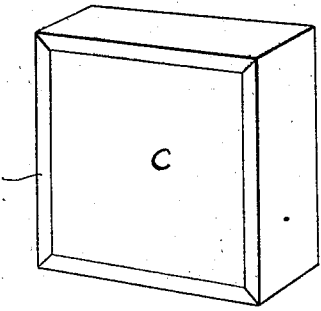

Figure 30 is a perspective view looking at the bottom of the covered box; and

Figure 31 is an end elevation of the means to fold the lateral portions of the covering web to show the arrangement thereof in folding the web over the edge at the open end of a box which is of greater length than width.

Similar characters of reference designate like parts throughout the different views of the drawings.

The embodiment of the invention illustrated in the drawings comprises a base B having a standard S mounted thereon upon which the operative parts of the apparatus are mounted and supported. A box form of suitable material, such as wood, and of rectangular shape consisting of an end member 1 and sides 2 (Figure 8) is adjustably mounted by screws or bolts passing through the end member upon a head 3 fixed to a shaft 4 journaled in a bracket 5 mounted on a carrier 6 slidably supported upon a bracket 7 mounted upon the standard S. The shaft 4 with the head 3 constitutes what is termed herein as a "rotatable box form support." The shaft 4 is rotated by a shaft 8 operatively connected thereby by a bevel pinion 9 on said shaft meshing with a bevel pinion 9′ on the shaft 4, the shaft 8 being rotatably supported in the carrier 6 and slidably engaging in and keyed to a hollow stud shaft 8′ to rotate therewith and have axial movement relative thereto, said shaft 8′ being journaled in the bracket 7 and driven from a telescoping shaft rotatable on a vertical axis and consisting of a hollow shaft section 10 journaled in the bracket 7 and a shaft section 10′ journaled in a bracket 11 mounted on the standard S and slidably engaging in and keyed to the shaft section 10 to rotate therewith and have slidable movement relative thereto for a purpose to be hereinafter described. The stud shaft 8' has a bevel pinion 8'' fixed thereto meshing with a pinion 10'' on the shaft section 10 to operatively connect the two.

The telescoping shaft 10, 10' is intermittently rotated and thereby the box form supporting shaft 4 by a Geneva gear comprising a wheel 12 fixed to a shaft 13, said wheel being arranged with radial slotted and equidistantly spaced projections 14, there being six of these projections utilized in the present instance, whereby the box support is given six intermittent rotative movements in one cycle of operation in covering a box on the box support. (Figures 1, 3, 5, 21 and 22.) The wheel is intermittently actuated from a shaft 15, herein termed as the "driven shaft," by means of an arm 16 fixed to said shaft carrying a roller mounted on a stud projecting laterally from the end of the arm, as at 17, and adapted to engage successively in the slots of the radial projections 14 of the disk 12, said arm being arranged with relation to said wheel whereby during one revolution of the driven shaft 15 the roll 17 will engage in a slot in a projection 14 and move said wheel one-sixth of a revolution and move out of said slot positioning the wheel so that the roll 17 will engage in the successive wheel slot upon the successive revolution thereof. To lock the Geneva wheel 12 against movement during the periods or intervals of rest a disk 18 is mounted on the shaft 15 in juxtaposed relation to the roll carrying arm 16, or it may be constructed integral therewith, which is adapted to engage in curved recessed portions 19 intermediate the slotted projections 14 of the wheel 12, the disk 18 having a segment 20 removed therefrom, radially to which the roll carrying arm 16 extends, to permit of the passage of the slotted arm 14 of the wheel 12 as it is moved by the arm 16. The telescoping shaft 10, 10' is operatively connected to the shaft 13 by a bevel pinion 21 meshing with a bevel pinion 21' on shaft 13.

Figures 6, 7:
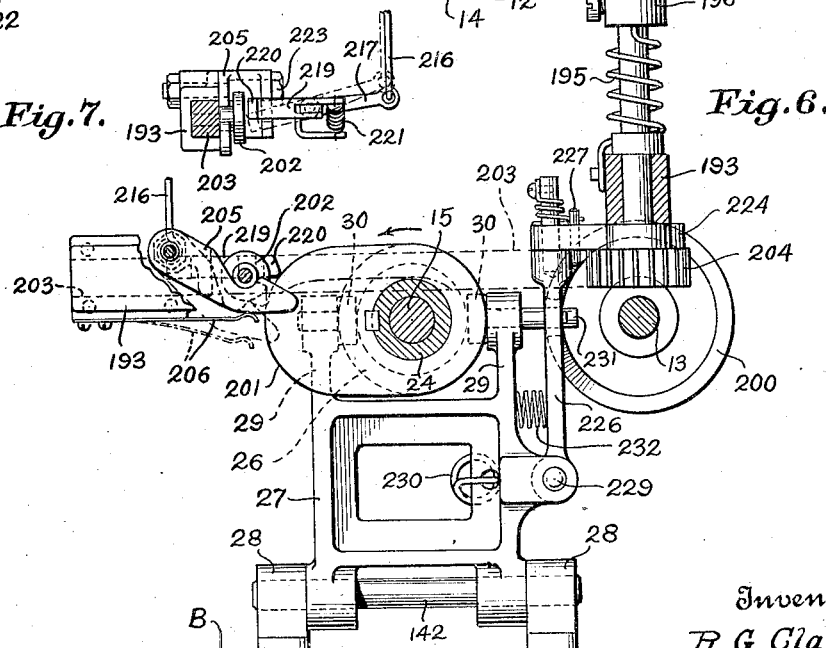
Figure 6 is a sectional end elevation taken substantially on the line 6—6 of Figure 5 looking in the direction of the arrows with parts broken away to illustrate certain features of the box transferring means.
Figure 7 is a sectional detail view taken substantially on the line 7—7 of Figure 5 looking in the direction of the arrows of means actuated by a box on the conveyor for setting the box transferring means in operation to move a box from the conveyor to the support.

The driven shaft 15 is driven from a suitable source of power, such as a pinion (Figure 5) fixed to the power shaft 22' or a motor (not shown) meshing with a gear 23 fixed to a hollow shaft 24 journaled in the standard or frame-work upon and through which the shaft 15 extends and operatively connected to the shaft 15, in the present instance shown as a clutch for a purpose to be hereinafter described. One member 25 of the clutch is fixed to the shaft 15 in abutting relation to the end of the hollow shaft 24 and the other clutch member 26 being mounted on and keyed to the hollow shaft 24 to participate in the rotative movement and have axial movement thereon, the clutch member 26 being thrown into and out of operative relation with the clutch member 25 in a manner and for a purpose to be hereinafter described by a shifter 27 (Figure 6) pivotally supported by blocks 28 fixed to the base B, said shifter having arms 29 to engage at opposite sides of the clutch member 26 and rotatably carrying studs having heads to engage in an annular groove in the clutch member, as shown at 29. It will be obvious that when the driving shaft 24 is coupled to the driven shaft 15 through the clutch that the latter shaft will be rotated and therewith the member 16 of the Geneva gear the latter co-operating with the Geneva wheel 12 to intermittently rotate said wheel and thereby the shafts 10, 10' and 8, 8' and rotate the box form support.

As a box is placed upon the box support and during the interim of placing the box thereon and the intermittent rotation of the box form support the leading end portion 31 of a box covering web or strip W from a supply roll 32 is applied thereto. (Figures 1, 2, 8, 21, 22 and 24.) The roll 32 is rotatably supported in arms 33 mounted upon the framework with the web passed from said roll and over a roll 34 rotatably carried by and engaging in a box 35 carrying an adhesive, such as fluid gum, whereby said web in passing over said roll the roll will be rotated carrying the gum from the box 35 and applying the same to one surface of the web. From the roll 34 the web passes around a roll 36 rotatably carried by the adhesive carrying box, and from said roll 36 is passed over a guide roll 37 rotatably carried by the arms 33 and thence over a roll 38 rotatably carried by an arm 39 fixed to and extending upward from the framework. From the roll 38 the web passes over a roll 40 journaled in a bifurcation 41 at one end of an arm 42 pivotally supported at the opposite end upon the frame-work.

The arm is moved to position the end carrying the web carrying roll 40 with the leading end portion 31 of the web adjacent a side and the corner of a box C on the form support and away from the support in proper timed sequence to the intermittent movement of said support by the Geneva gear through a cam 43 on the shaft 15 (Figures 5, 21 and 22) actuating a lever 44 carrying a cam follower roller 45 intermediate its ends to engage the cam, the lever being pivotally supported on a stud, as at 46, carried by an arm 47 having a hub 48 whereby it is supported upon the shaft 15 (Figure 5) and held in fixed position against movement with the shaft by securing the same to the framework, as shown at 49. The lever 44 is connected to the roller carrying arm 42 by a rod 50. As the cam following roller 45 rides off from the high portion of the cam 43 the arm 42 will be moved therewith due to the weight of said lever and arm and the parts carried on the latter thereby moving the roll carrying end of the arm 42 from the position shown in Figure 21 to that shown in Figure 22. As the arm 42 is moved to the position indicated in Figure 22 the leading end portion 31 of the web is applied to the side of the box adjacent the corner thereof. This means comprises a presser lever 51 of bail shape pivotally carried by the arm 42 on the axis of rotation of the roller 40, one end or the connecting portion of the lever being arranged with a head faced with a yielding material, such as soft rubber, as shown at 52, to engage the web and press it against the box. The presser lever is arranged with a projection 51′ whereby it is pivotally connected to a link 53 pivotally connected to the fixed arm 39. It will be obvious that due to the connection of the presser lever with the fixed arm 39 that as the roll carrying arm 42 is moved to the position shown in Figure 22 the presser head carrying end of the lever will be moved toward the box C on the support. As the leading end portion of the web is positioned relative to the box on the support during the movement of the arm 42 due to the lever roll 45 riding off from the cam 43 the free curved end 54 will engage in a radial recess 55 in a disk 56 fixed to the shaft 13 in juxtaposed relation to the wheel 12 of the Geneva gear and thereby lock the Geneva gear against movement during the positioning and applying of the leading end portion of the web to the box on the support.

After the leading end of the web has been applied to the box the movement of the cam 43 is so timed that it will raise the lever 45 and thereby the roll carrying arm 42 moving the presser lever 51 and the web supporting roller 40 to the position shown in Figure 21. When the box is rotated with the box form the web is being withdrawn from the supply roll over the roller 40 and wrapped around the box during the rotation thereof. To permit of the web having feeding movement over the roller 40 and prevent retrograde movement thereof or the slipping of the web over the roller as the roller is moved with the arm 42 to position the leading end of the web relative to the box on the box support grippers and provided to yieldingly engage and hold the web against the roller, said grippers comprising counterweighted fingers 58 pivotally mounted on a rod 59 extending transversely of the bifurcated end 41 of the arm 42, the counterweights being so arranged as to move the fingers toward the roller and any retrograde movement of the web will tend to forcibly impinge the fingers against the roller clamping the web thereto, while feeding movement over the roller will tend to move the fingers outward from the roller against the pressure of the weighted ends.

To maintain the box with the side thereof in substantially the same plane as the leading end portion of the covering web and cause the box to exert a straight pull upon the web as it is drawn from the supply roll 32 and at all times maintain it in contiguous relation to the side of the box the box form support is reciprocated transversely to its axis of rotation during the rotative movements thereof, means being provided to guide box in said movement and relative to which guiding means the form support is positioned during the periods or intervals of rest to facilitate the operation of means to wipe and press the web against a side of the box and also facilitate the folding of lateral portions of the web against the bottom and over the edge at the open end of the box. For this purpose the carrier 6 for the form support is slidably mounted and the driving shaft 8 for the form support is mounted to have axial movement. This reciprocatory movement is imparted to the box form support through suitable mechanism, in the present instance shown as fluid actuated means comprising a cylinder 60 having at opposite ends 60′ and 60″ arranged for mounting upon the bracket 7, as at 61, said heads having ports 62, 62′ for the admission and exhaust of the motive fluid and communicating with valve chambers 63, 63′. A piston 64 reciprocable in the cylinder is connected by a rod 64′ with the supporting bracket 5, as at 65, for the box form support, said rod passing through the head 60″ and a stuffing box 66 arranged in said head. The cylinder is connected through the ports 62, 62′ to a source of motive fluid, such as an air pressure tank, which may be arranged in the base B (Figure 1) and the pressure maintained in said tank by a suitable pumping mechanism (not shown) connected to the tank as by a pipe 67. A pipe 68 leads from said tank and is connected to a branch pipe 68′ in communication with ports 69, 69′ leading to the valve chambers 63, 63′. The admission of motive fluid pressure and the exhaust from the cylinder through ports 62, 62′ is controlled by a pair of valves 70, 70′ slidable in the valve chambers and connected as at 71″, to actuate said valves in unison, said connection being a flexible one to prevent the binding of the valve should they get out of alinement. The valve 70 has a port 71 adapted to be placed in register with the ports 62 and 69 to connect the cylinder at the forward end of the piston with the fluid pressure supply, and the valve 70′ has a port 71′ adapted to be placed in register with the ports 62' and 69' to connect the cylinder at the rear of the piston with the fluid pressure supply.

The fluid pressure is exhausted from the cylinder at the rear of the piston through a port 72 in the valve 70' having an opening through the lateral wall of the valve adapted to be placed in register with the port 62' in the cylinder head and having an outlet opening laterally of a portion of the valve extending beyond the cylinder and at all times open to the atmosphere, the valve mechanism being connected through said valve extension, as at 73, to be actuated by the movable member 74 of a gauge, which is pivotally supported at 75 to a fixed gauge member 74', said gauge member being provided to guide the box form support in its rotative and reciprocatory movements in the manner hereinafter described. The exhaust from the cylinder at the front of the piston is through a port 76 in the valve 70 having an opening through the lateral wall thereof adapted to be placed in communication with the cylinder port 62, said valve port 76 opening to the atmosphere through the end of the valve. To cushion the piston or plunger 64 and thereby the box support to prevent sudden retractive movement the exhaust of the air through the valve port 76 the passage of the air through the port 76 is restricted, which restriction may be varied. For this purpose a plug 77 is threaded into the outlet end of the valve port 76, said plug having a tapered slot 77' (Figure 11) in the wall and extending longitudinally thereof, the bottom wall to said recess tapering from the inner to the outer end of the plug. It will be obvious that when the port 71' in valve 70' is in register with the ports 62' and 69' with fluid pressure will be admitted to the cylinder at the rear of the piston thereby causing the fluid pressure to move the piston into the cylinder and thereby moving the box form support in the same direction. In this position of the valve 70' the port 76 of valve 70 will be in register with the port 62 connecting the cylinder forward of the piston with the atmosphere and thereby permitting of the exhaust of the motive fluid pressure from in front of the piston. When the valves are adjusted as shown in Figure 11 with the port 71 in valve 70 in communication with the cylinder in front of the piston through port 62 and in communication with the fluid pressure supply through port 69, the cylinder at the rear of the piston is open to the atmosphere for exhaust of the motive fluid pressure by the valve ports 72 being in register with the cylinder port 62'. The valve mechanism is normally urged in a direction with a collar 78 on the connecting portion of the valve 70' with valves 70 through the valve chamber 63' by a spring 78' coiled about the connection of the valves and confined between the valve chamber 63 and a collar 79 fixedly carried by the valve mechanism. It will be obvious that due to the connection 65 of the piston with the supporting bracket 5 for the box form support that the latter will participate in the movements of the piston and be reciprocated transversely of its axis of rotation.

Figure 1:
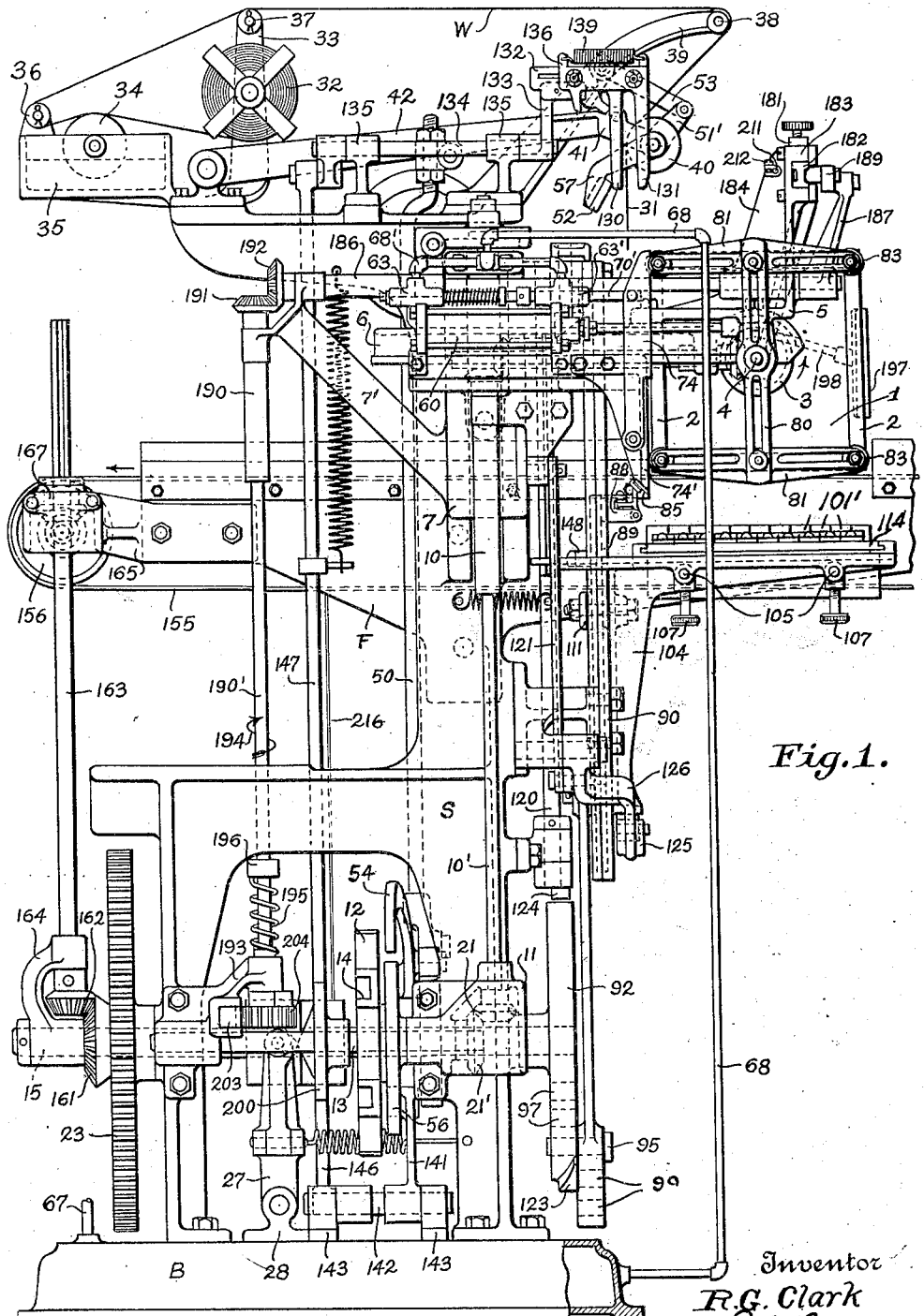
Figure 5:
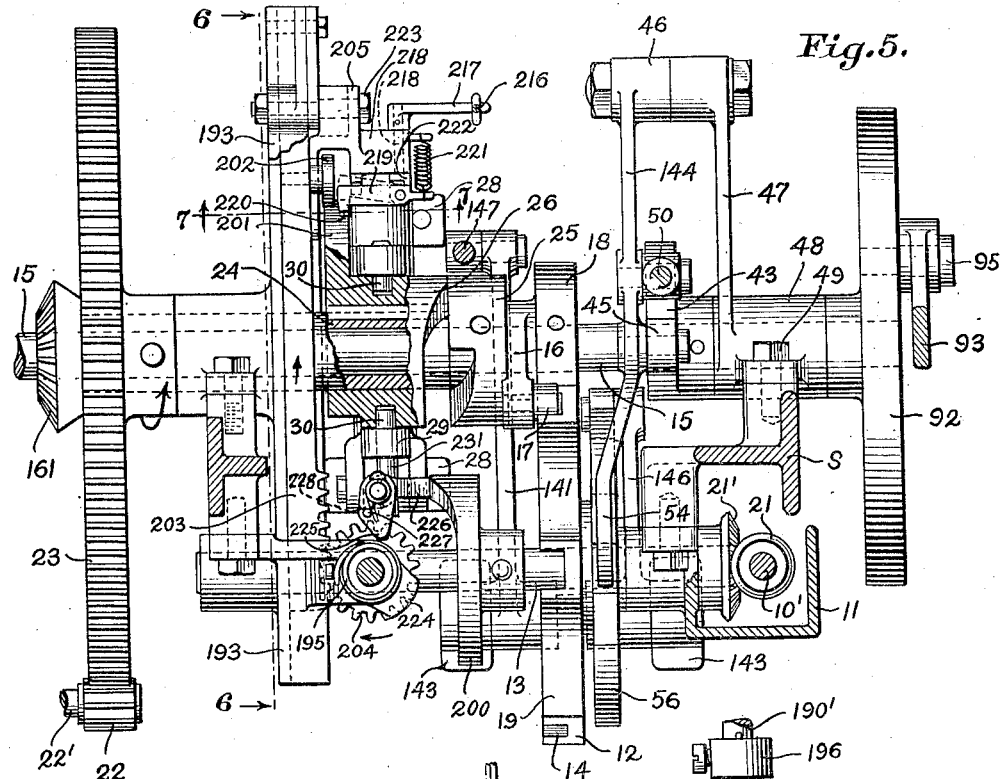
Figure 5 is a cross sectional view taken substantially on the line 5—5 of Figure 3 to show the arrangement of the driving means for the box support rotating means, and means for transferring a box from and to the box support.

To guide the box form support in its rotative and reciprocatory movements and position the same relative to means to wipe and press the web against the sides of the box and fold lateral portions of the covering web against the bottom and over the edge of the sides at the open end of the box, a guide frame is provided which guide frame is adjustable to adapt the apparatus for covering boxes of variable sizes. This frame comprises an arm 80 fixed intermediate its ends upon the shaft 4 of the box support to extend diametrically opposite from the axis of said shaft and has slots 80' arranged in the opposite ends. Arms 81 are mounted intermediate their ends in the slots of the arm 80 by bolts 82 to have adjustment in the slots 80' toward and away from the axis of the shaft of the box support and to extend transversely and laterally of the arm 80, the opposite ends of said arms being arranged with slots 81', rollers 83 being supported in said arm slots 81' by means of studs 83' on which the rollers are rotatable, to have adjustment toward and away from the arm 80. The box support is rotated in the direction indicated by the arrow in Figures 8 and 10, and during the rotative movement thereof the box to which the leading end portion of the covering web has been applied will exert a pull upon the web to unwind it from the roll 32 and wrap it around the box, the portion of the side of the box to which the web is applied being substantially in a plane with and below the web supporting and guiding roll 40 and being retained in this position by the frame rollers 83 engaging with the guide members 74, 74'. As a roller 83 engages with the guide member 74 due to the connection of said guide member of the valve mechanism 70', 70 of the fluid actuating mechanism, said valve mechanism will be moved to the positions shown in Figure 11 connecting the cylinder 60 forward of the piston 64 through ports 62, 71 and 69 with the source of motive fluid supply which will exert its force upon the piston to move the same outward or toward the box form support and the latter participating in said movement. The motive fluid in the cylinder at the rear of the piston during this movement of the piston is exhausted through ports 62' and 72 which in this position of the valve mechanism are in register. As the roll rides off from the gauge member 74 onto the gauge member 74' the tension of the spring actuating valve 78' will move the valve in reverse direction until the stop collar abuts against the valve 63' thereby placing the ports 62', 71' and 69' in register and connecting the cylinder at the rear of the piston with the motive fluid supply, and simultaneously the valve 70 will be moved with the exhaust port 76 therein in register with the cylinder port 62 to exhaust the motive fluid from the cylinder in front of the cylinder. As a pair of rollers 83 on the guide frame engage with the gauge members 74, 74', as shown in Figures 1 and 10, the box form support reciprocating means will be maintained in equilibrium with the cylinder ports 62, 62' shut off by the valve mechanism from the motive fluid supply and also from the exhaust ports in the valves as shown in Figure 10.

As the box form support is positioned relative to the gauge members 74, 74' the covering web is firmly pressed against the side of the box C on the box form on the support positioned and extending in parallel relation to said gauge members by a wiper 85 of yielding material, such as soft rubber releasably carried in bifurcation 86 of a carrier 87 of right angle shape in cross section pivotally supported by a bracket 88 attached to a slide 89, mounted to have vertical reciprocable movements in a slideway of a bracket 90 fixed on the framework, the wiper carrier 89 being urged in a direction to press the wiper against the box by a spring or springs 91 coiled about headed studs threaded into the supporting bracket for the wiper carrier, the spring being confined between the heads of said studs and the carrier (Figure 18). The wiper carrier slide 89 is operatively connected by a rod 93 with a disk 92 rotatable with the driven shaft 15, one end of the rod being pivotally mounted upon a stud 94 fixed in and extending laterally from the slide and the other end pivotally connected to the disk eccentric to its axis of rotation, whereby as the disk is rotated the wiper carrying slide is reciprocated. To impart reciprocable movements of variable extent to the wiper to adapt the same for the pressing of the web to boxes of different sizes the connection of the rod or link 93 with the disk is adjustable, this adjustment being affected by engaging the supporting stud 95 in either one of a series of perforations 96 in the rod and releasably securing the supporting studs in either one of the series of openings 97 in the disk. The movement of the wiper carrying slide is so timed with relation to the rotative movement of the box form support so that when the box is positioned relative to the guide members 74, 74' and during a period of rest of the form support the wiper will be moved upward and yieldingly though forcibly pressed against the web and thereby causing the web to adhere to the box. As the wiper completes its upward movement another intermittent movement will be imparted to the box form support through the Geneva gear to position another side thereof relative to the gauge member 74, 74' and during such movement of the box form retracting movement will be imparted to the wiper.

In covering boxes of this character a covering web or strip is provided of a width so that the lateral portions thereof may be folded over the corners at the juncture of the sides with the bottom of the box and against the bottom, and also over the edges of the sides at the open end of the box, as shown in Figures 29 and 30. The wiper functions only to firmly press the web against the sides of the box as they are successively presented to the wiper, and during the next intermittent movement of the box support, the side of the box having the web pressed against the same with lateral portions extending beyond the bottom and edges at the open end of the box is presented to means to fold said lateral portions against the bottom and over said edges. The one lateral portion is folded against the bottom of the box by fingers 100 (Figures 1, 3, 12 and 13) of resilient and yielding sheet material secured at one end as by screws to blocks 101, said blocks being arranged at the back of T-shape in cross section to engage in a correspondingly shaped recess, as at 102', in a head 102 with the folding fingers in juxtaposed relation as shown, thereby producing in effect a folder comprising a series of resilient sections one of which is movable independently of the other. The free ends of the fingers extend beyond the head and have the extremities bent or curved backward whereby to provide a smooth surface to slide over the covering web and the bottom of the box. The fingers are so tensioned that the inherent tensions thereof normally tends to move the free ends of the fingers forward toward the head and into engagement with a ledge 103 on the head arranged intermediate the ends or extremities of the fingers. The finger carrying head 102 is carried by an elevator 104 by supporting bars 105 slidably mounted in openings in the elevator, as at 106, to have adjustment laterally of said elevator to adapt said folding fingers to operate upon boxes of different depth, the finger carrying head being locked in adjusted position by set screws 107 threaded into bosses on the elevator and engaging the head supporting bars 105. (Figures 12 and 13.)

The elevator is slidably mounted for reciprocable movement upon the supporting bracket 90 for the reciprocable carrier 89 for the wiper 85 by lugs 108 extending laterally from the elevator (Figure 12) engaging between gibs on the wiper carrier support 90 and secured thereto by a bolt 109 passing through an opening in the elevator and a longitudinal slot 110 (Figure 18) in the wiper carrier, and blocks 111 slidably engaging between gibs on the side of the wiper support carrier opposite to the elevator and interposed between said carrier support 89 and a nut on the bolt. The elevator is frictionally connected to the wiper to be reciprocated thereby by interposing a washer 112 of friction material, such as leather, between the guide block 111 for the elevator and the support for the wiper carrier. The elevator participates in the upward or web pressing movement of the wiper until the elevator engages with or abuts against the side of the box C on the form of the box support which is at the bottom and to which side the web had been pressed by the wiper during the previous period of rest of the box support, the lateral portions of the web extending beyond the top and bottom of the box. The engagement of the elevator with the box arrests the movement of the elevator when the wiper will complete its movement independent of the elevator which is permissible due to the frictional connection of the elevator with the wiper carrier and the engagement of the elevator supporting block 109 in the slot 110 of the wiper carrier. As the elevator approaches the box support the free end of the fingers 100 will engage with the covering web on the side of the box slightly beyond the corner or juncture of the bottom with the side and as the elevator continues to move upward the free ends of the fingers ride over the corner of the box and be moved against the inherent tension thereof and forcible though yieldingly slid along the bottom of the box thereby folding and firmly pressing the lateral portion of the web against the bottom of the box and drawing the web taut during such movement, as shown in Figure 30. As the elevator abuts against the box on the support means is actuated to fold the lateral portion of the web over the edge of the side at the open end of the box and engaging with the elevator. This means comprises a series of resilient fingers 100' similar to the fingers 100 secured at one end by screws to blocks 101' having the under side arranged to T-shape in cross section to engage a correspondingly shaped recess 102' in a table 114 slidably mounted at the ends between gibs 113 on the elevator to have reciprocatory movement in a direction toward and away from the finger carrying head 102. Reciprocatory movement is imparted to the finger carrying table 114 by a slide 115 mounted to have reciprocatory sliding movement in the elevator below the table 114, said slide having cam slots 116 arranged at substantially forty-five degrees transversely of the slide, rectangular cam follower blocks 117 slidably engaging in said cam slots and being mounted in the finger carrying table 114 by studs 118. It will be obvious that as the slide 115 is moved longitudinally in one direction due to the described connection thereof with the table the latter will be moved in a direction toward the finger carrying head 102 and the open end of the box on the box support engaged by the elevator. The free ends of the fingers 100' by their inherent tension normally engage with a ledge 103' extending longitudinally of the table at the free ends of the fingers and as the table with the fingers are moved toward the box on the support the curved ends of the fingers will engage below the lateral portion of the web and fold the same over the edge of the box against the inner surface thereof, as shown in Figure 13, the fingers pulling the web in a taut condition over said edge. As the slide 115 is moved in reverse direction the fingers will be moved away from the box on the support. The reciprocatory movement is imparted to the table actuating slide by an actuator comprising a vertical rock shaft 120 rotatably mounted in the framework having a web 121 fixed thereto and extending laterally from and longitudinally of said shaft engaging a notch 122 in the slide. The slide actuating rock shaft 120 is operated just previous to the termination of the web pressing movement of the wiper by a cam portion 123 on the wiper carrier actuating disk 92 co-operating with a cam follower 124 connected to the rock shaft 120 eccentric to its axis. The rock shaft is returned to initial position by a spring as shown. The wiper carrier commences its return movement just previous to the commencement of an intermittent movement of the box support and during the initial movement of said wiper carrier due to the frictional connection thereof with the elevator it will move the elevator therewith to move the elevator away from the box on the box support to permit rotative movement of said support with the box. The elevator participates in the downward or return movement of the carrier until the elevator is arrested by engaging a roller 125 (Figures 1 and 3) carried at one end of a stop arm 126 pivotally supported at the opposite end to a bracket 127 fixed to the framework. The free end of the arm is supported in predetermined position in relation to the movement of the elevator by a link 128 pivotally connected at one end intermediate the ends of the stop arm and at the other end to the mounting bracket 7 for the box form. During the retrograde movement of the elevator and wiper a further rotative movement is imparted to the box form to present another side of the box to the wiper and present the side of the box which had previously been presented for action thereon by the wiper to the means to fold the lateral portions of the web against the bottom and over the edge at the open end of the box, when the above described operations of the wiper and folders is repeated, and this operation is repeated until web wiper has been applied to all of the sides of the box.

Figure 27:
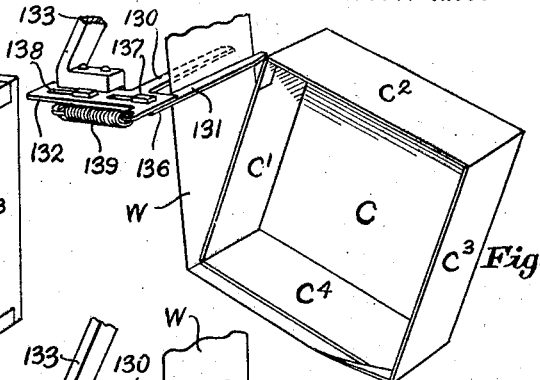
Figure 28:
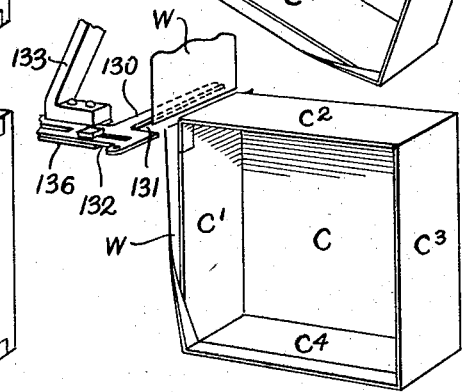

Means are provided to sever the web after four intermittent movements have been imparted to the box by the box support, said means comprising a pair of cutter or shear blades 130, 131, the plate 130 being connected to or constructed integral with the blade 132 whereby it is mounted in fixed position upon an arm 133 fixed to a rock shaft 134 rotatably supported in brackets 135 fixed upon the framework. The other blade 130 is connected to or constructed integral with a plate 136 whereby it is connected to the carrying blade 132 for the blade 130 to have movement relative to said plate, said connection consisting of headed studs 137 passing through slots 138 in the blade carrier 132 and fixed in the blade carrier 136, the movable blade 131 being normally urged to a predetermined position away from the fixed blade by a coiled tension spring 139 connected at opposite ends to lugs extending laterally from the blade carrying plates 132 and 137. During the fourth intermittent movement imparted to the box form after the leading end portion of the web has been applied thereto the cutting blade carrying shaft 134 is rocked to move the cutter blades from the position shown in Figures 1, 2 and 3 and in full lines in Figure 20 to the position shown in Figures 8, 18, 19 and the dotted line position in Figure 20 by a cam following roller 140 carried by an arm 141 fixed to a shaft 142 journaled in brackets 143 mounted upon the base B engaging a cam portion 144 in the disk 56 causing said arm to assume the dotted line position shown in Figure 20 during the action of a spring 145 connected at one end to the arm 146 and at the other end to a fixed part of the framework, said arm being fixed to the shaft 142 and whereby the cam 141 is connected to the shear blade carrying frame 133 by a rod or link 147. In the position of the shear blades shown in Figures 8, 18 and 19 and in dotted lines in Figure 20 the shear blades will straddle the covering web as shown in Figure 27. As the box form support is moved to the position relative to the gauge member 74, 74' the web will be drawn between the shear blades and as the wiper carrier approaches its uppermost position and previous thereto a lug 148 (Figures 18 and 19) will engage a cam 149 carried at the lower end and a vertical shaft 150 rocking said shaft and causing an arm 151 carried at the upper end of the shaft to engage a lug 152 on the blade carrier 136 which is position relative to said arm as the shear blades are moved to web severing position, and move the shear blade 131 toward the shear blade 130 and thereby severing the web, as shown in Figure 28. It is to be understood that the cam actuated arm 141 of the shear actuating means engages the cam portion 144 of the disk 56 during a period of rest of the box support, and during the successive intermittent movement of the box support moved thereto by the Geneva movement the disk 56 will move with the Geneva member 12 thereby actuating the shear blade carrier to return the shear blades to full line position shown in Figure 20 and the positions shown in Figures 12 and 13.

As stated, it is an object of the invention to provide box covering apparatus in which all of the operations are automatic; that is, the placing of a box to be covered upon the box support, retaining the box on the support during the covering thereof and after the box has been covered remove the covered box from the support and placing another box thereon to repeat the operations. For this purpose a box conveyor is provided together with means relative to which a box on the conveyor is positioned and thereby position the box relative to the box form support, and means to transfer the box from the conveyor to the support which transferring means is adapted to hold the box on the support during the covering operation and operative by means actuated through the Geneva gear to remove the box from the support and reposition it upon the conveyor. The conveyor is in the form of an endless belt 155 (Figures 1, 2, 3, 15, 16 and 17) passing around pulleys 156, 157, the pulley 157 being fixed to the shaft 158 journaled in a bracket 159 adjustably carried at the end of the conveyor supporting frame F, slidably mounted on the standard or framework S for vertical adjustment, any slack in the conveyor being taken up by the adjustment of the pulley carrying bracket 158. The other pulley 156 is fixed to a shaft 160 journaled in a bearing at the end of the conveyor supporting frame F opposite to the pulley 157. The conveyor is actuated from the driven shaft 15 by a bevel gear 161 on said shaft meshing with a bevel pinion 162 on a vertical shaft 163 journaled at one end in a bracket 164 supported on the shaft 15 and rotatably and slidably mounted in a bracket 165 fixed to the conveyor support and which carries the conveyor pulley 156, and connected to said latter shaft by a bevel pinion 166 rotatably carried in a housing 167 carried by the bracket 165, said pinions being keyed to the shaft whereby to participate in the rotation of the shaft and adapted to have axial sliding movement on said shaft with the conveyor support for a purpose to be hereinafter described. The pinion 166 meshes with a bevel pinion 168 on the shaft 160 for the conveyor pulley 156. The conveyor is actuated when the shaft 15 carrying the pinion 161 is coupled to the hollow driving shaft 24 through the clutch member 26.

The conveyor support is mounted on the standard S for vertical adjustment by a clamping plate 169 engaging in a hollow column portion of said standard, as shown at 170, in Figure 17, having a slot 171 with an undercut portion of the plate engaging in and with the walls of said slot and in which slot a rib 172 on the conveyor support also engages, the conveyor support being secured in adjusted position by machine screws 173 passing through perforations in the support and threaded into the clamping plate 169. A box is guided in its travel with the conveyor belt by a guide member 174 with which the edges of the box at the open end engage, said guide being fixed to and extending longitudinally of the side of the conveyor support adjacent the supporting column 170, the one edge of the conveyor belt also engaging with such guide to be guided thereby, while the conveyor is guided at the opposite edge by a ledge in the form of a member 175 of angle shape in cross section fixed to and extending longitudinally of the conveyor support, one angle portion of the guide extending in a horizontal plane slightly above the surface of the conveyor belt. The boxes are maintained in position on the conveyor against the guide 174 by a gauge 176 consisting of a member of angle shape in cross section supported upon the conveyor guide 175 one angle portion, to constitute the guide proper, extending in a vertical direction; said guide being adapted to be adjusted toward and away from the guide 174 and secured in adjusted position by bolts 177 engaging in transverse slots 178 in the guide 176 and engaging in perforations in the conveyor guide 175. The guide 176 is adjustable to accommodate the same to boxes of different depths.

The means for transferring a box from the conveyor to the box form on its support 3 comprises a head 180 adjustably connected, as at 181, to a slide 182 to extend downward therefrom, said slide being reciprocably mounted in a slideway 183 arranged in the upper end of a bracket 184 fixed to and extending up from the bracket 5 in which the shaft 4 of the box support is journaled. The head is adapted to be moved from the box support and during said movement a suction cup 185 carried by the head axially of the box support engages the bottom of a box on the conveyor and transfers it from the conveyor onto the support. This movement is imparted to the box conveying head by a telescoping rock shaft consisting of a tubular section 186 which is rotatably supported in arm 7' extending laterally and upward from the bracket 7 for the carrier 6 of the box form support, and a section 186' slidably engaging in and keyed to the hollow shaft 186 to participate in the rotation thereof and have axial movement thereon, said shaft 186' being rotatably supported in the bracket 184 with the end projecting beyond the same and having an arm 187 fixed thereto, the shaft section 186' being held against axial movement relative to the bracket 184 by said arm 187 and a collar 188 fixed to the shaft at the side of the bracket opposite to the arm. The arm 186 has a link connection 189 with the head carrying slide. By the arrangement of the telescoping shaft 186, 186' the box transferring head is adapted to participate in the reciprocable movements of the box support. The transferring head 180 is moved and urged in a direction toward the box support by a spring influenced shaft comprising a pair of telescoping sections 190, 190', the hollow section 190 being rotatably supported by the bracket arm 7' and the other section 190' engaging in and keyed to the hollowed shaft whereby the rotative movement of one will impart rotative movement to the other and permit the hollow shaft section to have axial movement relative to the other section for a purpose to be hereinafter described. The telescoping shaft section 190' is operatively connected to the telescoping shaft 186, 186' by a bevel pinion 191 rotatable with the shaft section 190 meshing with a bevel pinion 192 rotatable with the shaft section 186. The shaft section 190' is rotatably supported in a bracket 193 fixed to the framework and is normally urged in the direction indicated by the arrow 194 in Figure 1 by the tension of a spring 195 coiled about the shaft secured in fixed position at one end to the bracket 193 and the other end attached to an adjustable collar 196 on the shaft. The shaft actuating spring 196 operates to maintain the box transferring head 180 in position with the suction cup 185 in engagement with the box on the box form and to permit rotative movement of the suction cup with the box it is rotatably supported in the box transferring head. To prevent a successive box on the conveyor being moved therewith during this position of the head a stop gauge 197 is provided, said gauge being mounted on a stem 198 and whereby it is adjustably mounted on the head to participate in the movement thereof, this gauge stop is in the form of a plate having an end adjacent the box support bent laterally toward the head, as at 199. By this arrangement as the transfer head is moved forward the box support the gauge stop 197 will engage and be moved between the box being transferred from the conveyor to the support and the next following box on the conveyor holding this latter box on the conveyor against movement therewith. The box transferring head is retained in position with a box on the support during six intermittent movements of the box support imparted thereto by the Geneva gear 12, 16. As the sixth intermittent movement is imparted to the Geneva wheel 12 the driven shaft 15 and thereby the Geneva gear is uncoupled from the driving shaft 24 by disengaging the clutch member 26 from the clutch member 25, this being accomplished by a cam 200 fixed to the shaft 13 of the member 12 of the Geneva gear to rotate therewith, this cam 200 co-operating with the clutch shifter 27 to move the clutch member 26 away from the clutch member 25 to the position shown in Figure 5. During the continued rotation of the clutch member 26 with the driving shaft 24 a cam 201 rotatable with said clutch member, and which may be constructed integral therewith, engages a roller 202 carried on a stud projecting laterally from a rack 203 slidably supported to have reciprocable movements in the bracket 193 and moving the rack in the direction of the arrow indicated in Figure 5. The rack meshes with a pinion 204 fixed to the spring actuated shaft 190' thereby imparting retrograde movement to said shaft in the direction of the arrow indicated in Figure 5 against the tension of its actuating spring and imparting reverse movement to the telescoping shaft 186, 186' and rocking the arm 187 connected to the transfer head carrying slide 182 moving the slide to move the transfer head away from the box support. The suction cup due to a partial vacuum being created between said cup and the bottom of the box will withdraw the box from the box form on the support and reposition it on the conveyor. To facilitate the removing of the box from the box form and preventing the creation of a vacuum between the box and the form, the bottom of the form is perforated as at 1ª. As the rack 203 is moved to the limit of its movement by the cam 201 the rack roll 202 will be positioned with its supporting stud or the hub thereof over a latch 205 (Figures 5 and 6) pivotally carried by the rack support to extend toward the cam 201, and said latch is caused to engage with the roller hub or its stud by a spring 206 thereby holding the rack against movement through its connection with the pinion 204 on the spring actuated shaft through the influence of the spring. As the transfer head is positioned with the box removed from the support and positioned on the conveyor means are provided to destroy any vacuum between the suction cup and the box.

For this purpose a port extending through the support of the suction cup communicates at the one end with the suction cup and the opposite end being normally closed by a spring influenced valve 207 movable in a direction longitudinally of the suction cup support. As the transfer head is moved to the position shown in dotted lines in Figure 3 said valve is unseated to open the port to the atmosphere by a bell crank lever 208 pivotally carried by the transfer head, one arm of the lever engaging an annular groove in the valve and the other arm being connected by a link 209 with an arm of a second bell crank lever 210 the other arm of which lever is connected thereto a rod 211 (Figure 2) which slidably engages in a perforation in a web of the bracket 182 with a collar 212 adjustably mounted on the end of the rod at the outer side of said bracket which is adapted to engage with the web of said bracket as the transfer head is moved to the dotted line position in Figure 3 thereby rocking the arm actuating lever 208 through its connection thereof by the link 209 and lever 210. When the transfer head is moved to transfer a box from the conveyor to the box support the valve 207 is automatically moved to closing position by its spring. By the adjustment of the collar 212 this valve actuating means is adapted for use with the transfer head in transferring boxes of different sizes from and to the conveyor. The members are retained in this position with the clutch member 26 rotating idly with the driving shaft 24 until a box is positioned on the conveyor belt relative to the box support in engagement with a stop comprising a slide or rod 213 slidably carried by the conveyor support F having the end bent laterally, as at 214, to extend over the conveyor in the path of a box thereon. The engagement of the box with said stop causes mechanism to be set in operation to again couple the operative mechanism to the driving shaft. For this purpose the stop slide 213 is connected at the end opposite to the stop with a crank at one end of a rod or shaft 215 pivotally supported by the conveyor support and extending transversely thereof, the opposite end of said rod being arranged with a crank and connected to a rod 216 (Figures 3, 15, 16 and 17) which is connected to an arm 217 (Figures 5, 6 and 7) fixed to a stud shaft 218 mounted in a laterally projecting part 218' of the rack holding latch 205 to have rotative movement on an axis transverse to the axis of movement of the latch. A latch 219 is pivotally carried at the opposite end of the shaft 218 to have movement in a vertical direction, the one end of said latch having a nose 220 which projects into the path of the movement of the cam 201 rotatable with the clutch member 26 and engaged thereby as the cam passes said latch nose, said end of the latch being urged in a direction towards the cam by a spring 221 connected at one end to the end of the latch 220 opposite to the nose and the opposite end of the spring connected to a pin fixed in and extending laterally from the projection 219 of the latch 205. This spring also functions to impart rotative movement to the latch carrying shaft 218 and thereby moving the nose end of the latch upward, this upward and forward movement of the latch being limited by a stop 222. The latch 219 is maintained in this latter position by the spring 221 with no box in engagement with the stop slide 213 and as the cam 201 engages with the latch nose 220 it will be moved backward over a shoulder 223, as indicated in dotted lines. However, as a box on the conveyor engages with the lateral bent stop end 214 of the stop slide 213 the movement of the box with the conveyor and the engagement thereof with the stop will move the stop rod longitudinally to a limited extent moving the arm 217 (Figures 5 and 7) to the dotted line position through its connection by the rods 216 and 215 with the stop slide, thereby rocking the shaft 218 and thereby the latch 219 downward to position to engage in front of the shoulder or stop 223 and as the cam 201 engages with the nose of the latch 219 it will move the same downward and with it the rack holding latch 205 releasing said latter latch from the cam following roller 203 and thereby permit the rack to move in a direction reverse to that indicated by the arrow in Figure 5 by the shaft 190′ under the influence of its actuating spring 195. During the continued rotation of the cam 201 from the position and in the direction indicated by the arrow in Figure 6 the rack roller 202 will be caused to follow said cam through the action of the spring influenced shaft 190′, said shaft rotating in a direction reverse to that indicated by the arrow in Figure 5, and as said shaft rotates a cam 224 fixed to and extend laterally from said shaft will engage an abutment 225 movably mounted on the end of a cam following arm 226 co-operating with the cam 200 to impart clutch uncoupling movement to the clutch shifter 27, the abutment being held against movement as the shaft cam 204 engages therewith by a pin 227 in said abutment engaging a stop shoulder 228 on the arm 226, shown in dotted lines in Figure 5, and thereby causing the cam 224 to rock the arm 226 upon its pivotal support 229 upon the clutch shifter, the arm being guided in this movement by the engagement of the extended end of one of the studs carrying a head 30 to engage the annular groove of the clutch member 26 in an opening in the arm, as shown at 231, thus moving the cam arm out of engagement with the high portion of the shifter actuating cam 200, that is from the position shown in Figure 5, so that the cam following arm will engage in back of the high portion of the cam as viewed in Figure 5, thereby permitting the clutch shifter 27 to be moved by a spring 230 (Figure 6) into engagement with the clutch member 25 to operatively connect the driving shaft 24 with the driven shaft 15 and thereby the box support actuating means, the web applying means and the web severing means to the driving shaft through the Geneva gear and the mechanism to fold the lateral portions of the web against the bottom and over the edge of the sides at the open end of the box and functioning to cover a box on the box support. As the clutch member 26 moves to clutching position it carries with it the rack actuating cam 201 away from the rack roller 202 and the latch 219 whereby they will not be actuated by said cam during the rotation thereof, and the rack maintained in its foremost position by the spring actuated shaft 190′. The arm 226 is normally urged in a direction toward the cam 200 by a spring 232. As the spring actuated shaft is rotated by its spring to move the arm in a direction reverse to that indicated by the arrow in Figure 5 said shaft through its connection with the transfer head carrying slide 182 described will move said transfer head in a direction toward the box support to transfer a box on the conveyor positioned relative to the box support onto the latter.

Figure 23:
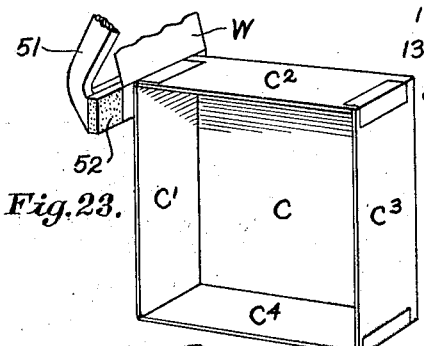
Figure 24:
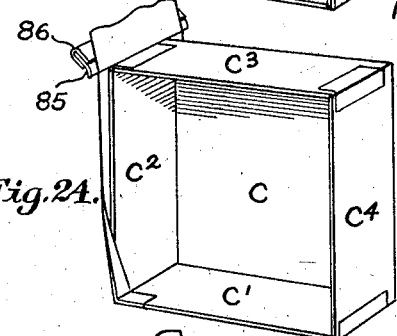
Figure 25:
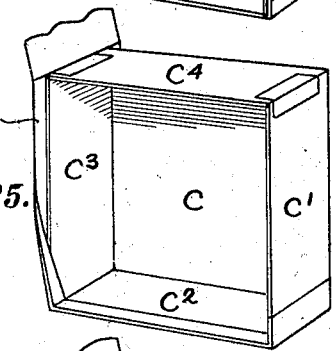
Figure 26:
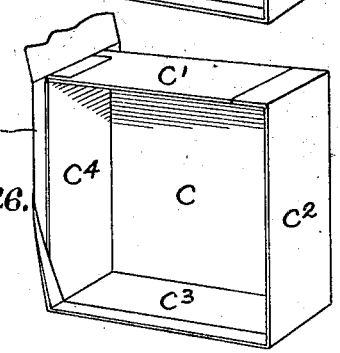

After the box transferring means has been actuated to position a box on the box support the leading end portion 31 of the box covering web or strip is applied to the side of the box adjacent the corner of a side $c'$ positioned relative to the gauge members 74, 74′, as shown in Figure 23, and in this position the wiper 85 is actuated to move upward in contact with the side of the box and the folding fingers 100 and 100′ are positioned and actuated to go to the movement of folding the lateral portions of the web against the bottom and over the edge of the side of a box although the web has not been applied to the box. Intermittent movement is then imparted to the box support with the box to position the box as shown in Figure 24, the movement of the box drawing the web from the supply roll 32 and wrapping it around the side $c^2$ and during which movement of the box support retrograde movement is imparted to the wiper and folding mechanisms. As the box is positioned as shown in Figure 24 the wiper and folding mechanisms are again actuated the wiper pressing the web against the side $c^2$ of the box and the folding fingers folding the leading end portion of the web against the side $c^1$ adjacent the corner. Further rotative movement is then imparted to the box and simultaneously therewith retrograde movement to the wiper and folding fingers, the web being wrapped around the side $c^3$ and the box positioned as shown in Figure 25 when the wiper is actuated to press the web against the side $c^3$ and the folding fingers operate to fold the web against the bottom and over the edge of the side $c^2$. A further intermittent movement is then imparted to the box to position it as shown in Figure 26 with the web wrapped around the side $c^4$ and retrograde movement imparted to the wiper and folding fingers, and when the box is in said position the wiper operates to press the web against the side $c^4$ and the folding fingers to fold the web against the bottom, and over the edge of the side $c^3$. The box is then moved to the position shown in Figure 28 with the web applied against the side $c^3$ with the end in overlapped relation to the leading end portion of the web previously applied to the box and return movement is imparted to the wiper and folding fingers. As the box is moved to the position shown in Figure 28 the shear blade carrier actuating means is operated to position the shear blades to straddle the covering web as shown in Figure 27, the shear blades remaining in said position until the box is positioned as shown in Figure 28. The wiper then operates to press the web against the side $c^1$ and the folding fingers operate to fold the web against the bottom and over the edge of the side $c^4$. As the wiper approaches the termination of its wiping movement the cam follower projection 48 on the wiper carrying slide 89 engages the cam member 149 on the shaft 150 actuating the arm 151 fixed on said shaft to engage the projection 152 of the carrier 136 for the shear blade 131 thereby moving said blade toward the blade 130 and co-operating with the latter to sever the web. The box is then given another increment of movement to position the same relative to the gauge members 74, 74', as shown in Figure 29 with the side $c'$ in position to be engaged by the folding finger carrying elevator 104 when the wiper is moved along the side $c^2$ although the covering web has previously been applied thereto and the folding fingers operate to fold the web against the bottom and over the edge of the side $c^1$ when the operation of covering the box is completed. Another increment of movement is then imparted to the box. It will be noted that in order to apply the covering web to the box it is necessary to impart five increments of movement thereto. The sixth movement is imparted to the box support so that the box may be removed from the box support in the same position in which it was applied thereto, since invariably boxes of this character have a greater length than width, and should a box be placed on the box support with the longitudinal sides extending in a horizontal plane it is necessary that the successive boxes be arranged in this manner upon the conveyor in order to have the mechanism function properly.

In the foregoing description there has been embodied in connection with the construction and arrangement of the parts also the manner in which they operate and it is therefore not deemed necessary to add a separate detailed description of the operation.

It will be noted that the box transferring means, and the box holding support and its actuating means are mounted on the bracket 7, and the conveyor mechanism is mounted on the frame F independent thereof. To adapt the apparatus for the covering of boxes of variable sizes said transferring means and box support with the bracket 7 and the conveyor support F are releasably mounted upon the framework to have adjustment relative to each other in a vertical direction and for which purpose shafts 10, 10' and 190, 190' are constructed of telescoping sections. The bracket 7 on the rear thereof is arranged with a rib to engage between gibs 233 and secured thereto by a clamping nut 234 engaging in the rear of the ribs having a threaded stud projecting therefrom and through an opening in the bracket 7 with a clamping nut threaded thereon, as shown at 235 (Figure 9). The nut 234 has threaded connection with a lead screw 236 rotatably supported, as at 237 and having a worm wheel 238 fixed therein with which a worm 239 on a shaft 240 meshes journaled in a housing 241 for the worm and worm wheel, as shown in Figures 2 and 19, said shaft having a hand operating wheel H fixed thereto. The clamping member 169 (Figures 15, 16 and 17) for releasably securing the conveyor support F to the column 170 of the framework is arranged with a threaded portion, as at 242, having threaded connection with a lead screw 243 rotatably supported, as at 244, in the framework and in a bracket, as at 245, and having a worm wheel 246 with which a worm 247 on the shaft 240 meshes. To adjust the mechanism for covering boxes of different sizes the clamping nut 236 is loosened to release the bracket 7 carrying the box form support, its rotating and reciprocating means and the box transferring means, and the screws 173 (Figure 16) are screwed out of the clamping member 169 to release the conveyor support F. In this position of the bracket 7 and conveyor support the hand wheel S is rotated thereby rotating the lead screws 236 and 243 through the worm gearing 238, 239 and 246, 247. By rotating the hand wheel in one direction the conveyor and bracket 7 will be moved in a direction away from each other to accommodate the mechanism to the conveying of large size boxes, and by rotating the wheel in reverse direction the conveyor support and the mechanism supported by the bracket 7 are adjusted toward each other to accommodate the same for covering smaller sizes of boxes. It will be noted that the worm wheel 238 is larger than the worm wheel 246. By this arrangement the bracket 7 and the mechanism carried thereby is adjusted one-half the distance of the conveyor support. This is necessary since the box form support is arranged to be in axial alinement with the axis of a box on the conveyor and should said support be adjusted a distance equal to the adjustment of the conveyor mechanism it would throw said support out of alinement with the axis of a box on the conveyor. After the conveyor support and the bracket 7 have been adjusted to the desired position the nut is threaded onto the stud 236 of the nut 234 securing the bracket in position, and the conveyor support is clamped to the column of the framework by screwing the screw 173 into the clamping member 169. To accommodate the movement of the wiper carrier 89 and the elevator 140 to the adjustment of the conveyor and the other mechanism to operate on different sizes of boxes the connection 95 of the wiper carrier actuating rod 43 is adjusted relative to the axis of the disk 92.

To prevent too great a movement of the elevator with the wiper carrier as the mechanism is adjusted to different sizes of boxes the stop carrying arm 126 for the elevator has the link connection 128 with the bracket 7, the connection of the link with said stop arm being such that the adjustment thereof will be proportional to the adjustment of the bracket 7.

In Figure 1 the mechanism for folding the lateral portion of the covering web against the bottom of the box and over the edge at the open end thereof is shown as adapted to operate upon a box the width of which is substantially the same as the length. In Figure 31 there is shown the positions the elevator carrying the folding mechanism will assume when covering a box having greater length than width. In the dotted line position the box is positioned by its support with the width engaging the gauge member 74, 74' and in which position the folding fingers 100, 100' operate to fold the web against the bottom and over the edge of a side of the box extending lengthwise thereof. When the box is positioned as shown in full lines in said figure the folding fingers 100' will operate to fold the covering web over the edge of the side of a box extending the width thereof. For this purpose the fingers are mounted upon the finger carrying table 114 to have adjustment relative to each other so that they will be contiguous to one another, as in Figure 1, or with a space interposed between adjacent fingers, as shown at 101ᵃ in Figure 31, whereby to provide a space between the fingers in which the side of the box engages as the folding fingers are moved by the carrying table 114 into the box to fold the web over the edge. The box form 1, 2 as shown in Figure 31 is of less depth than the depth of the box. The box is supported upon the form with the bottom thereof contiguous to the bottom 1 of the form whereby the portions of the sides at the open end of the box are free of the sides of the support and permit of the moving of the folding fingers to fold the web over the edge and against the inner surface of the box.

In Figure 4 I have shown a modified arrangement of the stop mechanism for limiting the downward or return movement of the elevator 104, the elevator engaging roller 125 being carried at the extremity of a right angle portion of an arm 250 fixed to the conveyor support F to extend downward whereby said elevator stop is adapted to participate in the adjustment of the conveyor.

It will be obvious that there may be various changes in the construction and arrangement of parts, and therefore variations may be resorted to and portions of the invention may be used without others, and come within the scope of the invention.

Having thus described my invention, I claim:

1. In box covering apparatus, a rotatable box form support, means to intermittently rotate said support, means to carry a gummed covering web for the box operative to apply the leading end of the web to a box on the support, said web being adapted to be wrapped around the sides of the box during the rotation of the support, and a wiper operative during the periods of rest of the support to press the web against the box.

2. In box covering apparatus, a rotatable box form support, means to intermittently rotate said support, means to carry a gummed covering web for the box operative to apply the leading end of the web to a box on the support, said web being adapted to be wrapped around the sides of the box during the rotation of the support, a wiper to press the web against the box, means to actuate said wiper during the periods of rest of the support, and means operative from the wiper actuating means to fold the lateral portions of the web against the bottom of the box and over the edge of the sides at the open end thereof.

3. In box covering apparatus, a rotatable box form support, means to intermittently rotate said support, means to carry a gummed covering web for the box operative to apply the leading end of the web to a box on the support, said web being adapted to be wrapped around the sides of the box during the rotation of the support, a wiper operative during the periods of rest of the support to press the web against the box, and means to fold the lateral portions of the web against the bottom and over the edge at the open end of the box.

4. In apparatus for covering rectangular boxes, a rotatable support for a box carrying form, means to intermittently rotate said support to a predetermined position, means to carry and position the leading end of a gummed web relative to a side of a box on the support, said web being adapted to be wrapped about the sides of the box during the intermittent rotation of the support, a wiper, a reciprocable carrier for said wiper operative during the periods of rest of the support to press the web against the side of the box and impart return movement to the wiper during the movement of the support, and means operative from the wiper carrier and during the actuation of the wiper to fold the lateral portions of the web applied to the side of the box against the bottom and over the edge of the sides at the open end of the box.

5. In box covering apparatus, a rotatable box form support; means to intermittently rotate said support and move the same transversely of its axis of rotation during the rotation thereof; a carrier for a gummed covering web for the box operative during a period of rest of the box support to apply the leading end portion of said web in a predetermined position to a box on the support and the web adapted to be wrapped around the sides of the box during the rotation of the support, means relative to which the box form is positioned and held during the periods of rest; and means operative during the periods of rest of the box support to press the web against a side of the box and fold lateral portions of the web against the bottom of the box and over the edge of a side of the box at the open end thereof.

6. In box covering apparatus, a rotatable box form support; means to intermittently rotate said support and move the same transversely of its axis of rotation during the rotation thereof; a carrier for a gummed covering web for the box operative during a period of rest of the box support to apply the leading end portion of said web in a predetermined position to a box on the support and the web adapted to be wrapped around the sides of the box during the rotation of the support, means relative to which the box form is positioned and held during the periods of rest, a wiper operative during the periods of rest of the box support to press the web against a side of the box; and means operative simultaneously with the wiper to fold the lateral portions of a web previously applied to a side of the box and extending beyond the bottom and edge at the open end thereof against the bottom and over said edge.

7. In box covering apparatus, a rotatable box form support; means to intermittently rotate said support and move the same transversely of its axis of rotation during the rotation thereof; a carrier for a gummed covering web for the box operative during a period of rest of the box support to apply the leading end portion of said web in a predetermined position to a box on the support and the web adapted to be wrapped around the sides of the box during the rotation of the support with lateral portions of the web extending beyond the bottom and edge at the open end; means relative to which the box form is positioned during the movement thereof and held during the periods of rest thereof; a wiper operative during the periods of rest of the box support to press the web against the side of the box; and means operative from the wiper to fold the lateral extending portions of the web applied to a preceding side of the box against the bottom and over the edge at the open end.

8. In box covering apparatus, a rotatable box form support; means to intermittently rotate said support and move the same transversely of its axis of rotation during the rotation thereof; a carrier for a gummed covering web for the box operative during a period of rest of the box support to apply the leadng end portion of said web in a predetermined position to a box on the support and arranging the web to be wrapped around the sides of the box during the rotation of the support with a lateral portion of the web extending beyond the bottom and edge at the open end; means relative to which the box form is positioned during the movement thereof and held during the periods of rest thereof; a reciprocable wiper movable in one direction during the periods of rest of the support and operative to press the web against a side of the box, and its retractive movement being concomitant with the rotary movement of the support; and means operative by the wiper during the web pressing movement thereof to fold the lateral portions of the web applied to the preceding side of the box against the bottom and over the edge at the open end of the box, said means being retracted during the retractive movement of the wiper.

9. In box covering apparatus, a rotatable box form support; means to intermittently rotate said support and move the same transversely of its axis of rotation during the rotation thereof; a carrer for a gummed covering web for the box operative during a period of rest of the box support to apply the leading end portion of said web in a predetermined position to a box on the support and arranging the web to be wrapped around the sides of the box during the rotation of the support with a lateral portion of the web extending beyond the bottom and edge at the open end; means relative to which the box form is positioned during the movement thereof and held during the periods of rest thereof; a reciprocable wiper movable in one direction during the periods of rest of the support and operative to press the web against a side of the box, and its retractive movement being concomitant with the rotary movement of the support; an elevator movable with the wiper during its web pressing movement to position the same relative to the box on the support; fingers carried by said elevator operative to fold a lateral portion of the web pressed against the preceding side of the box by the wiper against the bottom of the box; and fingers carried by the elevator to have movement transversely to the movement of the elevator when the latter is positioned relative to the box to fold the lateral portion of the web applied to the preceding side of the box over the edge at the open end thereof, said elevator participating in the retractive movement of the wiper to move the same away from the box on the support.

10. In box covering apparatus, a rotatable box form support; means to intermittently rotate said support and move the same transversely of its axis of rotation during the rotation thereof; a carrier for a gummed covering web for the box operative during a period of rest of the box support to apply the leading end portion of said web in a predetermined position to a box on the support and arranging the web to be wrapped around the sides of the box during the rotation of the support with a lateral portion of the web extending beyond the bottom and edge at the open end; means relative to which the box form is positioned during the movement thereof and held during the periods of rest thereof; a reciprocable wiper movable in one direction during the periods of rest of the support and operative to press the web against a side of the box, and its retractive movement being concomitant with the rotary movement of the support; an elevator movable with the wiper during its web pressing movement to position the same relative to the box on the support; resilient fingers carried by said elevator operative as said elevator is positioned relative to the box to fold a lateral portion of the web pressed against the preceding side of the box by the wiper against the bottom of the box; a head carrying resilient fingers slidably carried by the elevator to have movement transversely to the movement of the elevator and operative as the elevator is positioned relative to the box to fold a lateral portion of the web applied to the preceding side of the box over the edge at the open end thereof; and means to couple the elevator to the wiper to participate in the movement thereof to position the elevator relative to and move it away from a box on the box support.

11. In box covering apparatus, a rotatable box form support; means to intermittently rotate said support and move the same transversely of its axis of rotation during the rotation thereof; a carrier for a gummed covering web for the box operative during a period of rest of the box support to apply the leading end portion of said web in a predetermined position to a box on the support and arranging the web to be wrapped around the sides of the box during the rotation of the support with lateral portions of the web extending beyond the bottom and edge at the open end of the box; means relative to which the box form is positioned by the movement thereof and held during the periods of rest; a wiper to press the web against the side of the box; a reciprocable slide carrying said wiper operative in one direction during the periods of rest of the box support to actuate the wiper to press the web against the box side, and movable in reverse direction concomitantly with the rotation of the box support; means to actuate said slide; a slidably supported elevator; means to releasably couple said elevator to the wiper slide to participate in the movement of said slide to position the elevator relative to and move the same away from a box on the support; resilient fingers carried by said elevator operative as the elevator is positioned relative to the box to fold a lateral portion of the web against the bottom of the box; and a head carrying resilient fingers mounted on the elevator to have movement transversely of the elevator operative from the wiper carrying slide actuating means to actuate said head when the elevator is positioned relative to the box on the support.

12. In box covering apparatus, a rotatable box form support; means to intermittently rotate said support and move the same transversely of its axis of rotation during the rotation thereof; a carrier for a gummed covering web for the box operative during a period of rest of the box support to apply the leading end portion of said web in a predetermined position to a box on the support and arranging the web to be wrapped around the sides of the box during the rotation of the support with lateral portions of the web extending beyond the bottom and edge at the open end of the box; means relative to which the box form is positioned by the movement thereof and held during the period of rest; a wiper to press the web against the side of the box; a reciprocable slide carrying said wiper operative in one direction during the periods of rest of the box support to actuate the wiper to press the web against the box side, and movable in reverse direction concomitantly with the rotation of the box support; a driving shaft haing a disk mounted thereon; a crank connection between said disk and slide; a slidably supported elevator; means to releasably couple said elevator with the wiper slide to participate in the movement thereof to position the elevator relative to and move the same away from the box on the support; resilient fingers carried by said elevator operative as it is positioned relative to the box to fold a lateral portion of the web against the bottom of the box; a head carrying resilient fingers mounted on the elevator to have sliding movement transversely to the movement of the elevator; a slide carried by the elevator to have movement tranversely to the movement of the finger carrying head and arranged with cam slots; cam followers carried by the head to engage the cam slots of the slide; a rock shaft having an operative connection with said cam slide; and a cam portion on the wiper carrying slide actuating disk to cooperate with said rock shaft to rock the same and thereby actuate the cam slide and finger carrying head to cause the fingers to fold a lateral portion of the web over the edge at the open end of the box.

13. In box covering apparatus, a rotatable box supporting form; means to intermittently rotate said support and move the same transversely of its axis of rotation during the rotative movement thereof; means to carry a gummed covering web for the box operative during a period of rest of the support to apply the leading end portion in predetermined position to the box on the support; said web being adapted to be wrapped around the sides of the box during the rotation of the support; means operative during the periods of rest of the support to press the web against the side of a box and fold lateral portions of the web against the bottom and over the edge at the open end of the box; and means to sever the web at a predetermined point after a predetermined number of movements have been imparted to the support.

14. In box covering apparatus, a rotatable box form support; means to intermittently rotate said support and move the support transversely of its axis of rotation during the rotative movement thereof; a guide frame rotatable with said support; a gauge relative to which the guide frame is movable and positioned during the periods of rest of the support; a support and guide for a gummed covering web for the box operative to position the leading end portion of the web relative to said box on the support; means to press the free leading end portion of said web against the box, said web being adapted to be wrapped around the sides of the box by the rotation of the box with the support; and means to press the web wrapped around the box against the same and fold lateral portions of the web against the bottom and over the edge at the open end thereof.

15. In box covering apparatus, a rotatable support; box forms to carry boxes of variable sizes adapted to be mounted upon said support to rotate therewith; means to intermittently rotate said support and reciprocate the same transversely of its axis of rotation during the rotative movement thereof; a guide frame rotatable with the support, said frame being adjustable to variable sizes of boxes; a gauge member relative to which the guide frame is movable and positioned during the periods of rest of the support; means to carry a gummed covering web for the box operative to position the leading end portion of the web relative to a side of the box during periods of rest of the support and arranged with means to apply said end portion to the box, said web being adapted to be wrapped around the sides of the box during the rotation of the box with the support; means to which the sides of the box with the web wrapped around the same are successively presented operative to press the web against the sides of the box and fold lateral portions of the web against the bottom and over the edge at the open end of the box.

16. In box covering apparatus, a rotatable support for a box form; means to intermittently rotate said support; means to support and guide a gummed covering web operative to position and apply the leading end portion of the web relative to the box on the form on the support; said web being adapted to be drawn over said support and wrapped around the box during the rotation of the support; and means relative to which the sides of the box are successively positioned operative to press the web to the sides of the box and fold lateral portions of the web against the bottom and over the edge at the open end of the box.

17. In box covering apparatus, a rotatable box form support; means to intermittently rotate said support; means to support and guide a gummed covering web and operative to position and apply the leading end portion of the web relative to the box on the support, said web being adapted to be wrapped around the sides of the box during the rotation thereof, said means comprising a pivotally supported arm carrying a roller over which the web engages and movable by the arm toward and away from the box support, means to clamp the web to the roller to move the web with the roller toward the box form, and said means being operative to permit the web to move in feeding direction over the roll and hold the same against retrograde movement, and a presser arm pivotally carried by the roller carrying arm at the axis of rotation of the roller operative as the roller is moved toward the support to press the leading end portion of the web against the side of a box on the support.

18. In box covering apparatus, a box form support, a slidably supported carrier in which said form support is rotatably mounted, said carrier being adapted to reciprocate the form support transversely of its axis of rotation, a drive shaft for the form support comprising telescoping sections one section being journaled in fixed position and the other journaled in the carrier and operatively connected to the form support; and a Geneva gear operatively connected to said shaft to intermittently rotate the form support.

19. In box covering apparatus, a box form support; a slidably supported carrier in which the said support is rotatably mounted and adapted to reciprocate the support transversely of its axis of rotation; a shaft comprising telescoping sections one section journaled in fixed position and the other journaled in the carrier for the form support and operatively connected to the latter, a Geneva gear connected to the telescoping shaft operative to actuate the shaft to intermittently rotate the form support; means to carry a gummed covering web for the box adapted to apply the leading end portion thereof in predetermined position to the side of a box on the form during a period of rest of the form support; said web being adapted to be wrapped around the box during the rotation of the box form; means to which the sides of a box on the form support are successively presented operative during the periods of rest of said support to press the web against the box sides and fold lateral portions of the web against the bottom and over the edges at the open end; and means operative to sever the web after a predetermined number of movements have been imparted to the form support.

20. In a box covering apparatus, a box form support; a reciprocably supported carrier in which said support is rotatably mounted; means to intermittently rotate said support; means to reciprocate said carrier with the support transversely of the axis of rotation of the support and during the rotative movement thereof; means to support the leading end of a gummed web from a roll and operative to apply the same to the side of the box on the support during a period of rest of the latter; said web being adapted to be delivered from the roll over the web support and wrapped around the box during the rotative movement thereof; means to which the sides of the box are successively presented to press the web against the sides of the box and fold lateral portions against the bottom and over the edge at the open end of the box; and means to sever the web at a predetermined point in the rotative movement of the support.

21. In box covering apparatus, a box form support; a reciprocable supported carrier in which the support is rotatably mounted; means to intermittently rotate the support including telescoping shaft sections one section being journaled in fixed position and the other journaled in the carrier and geared to the support; means operatively connected to said telescoping shaft including a Geneva gear to intermittently rotate the shaft and thereby the box form support; fluid actuated means connected to the carrier for the box form support operative to reciprocate said support during the rotative movements of the support; a gauge; a guide frame carried by and movable with the box form support to position the box form support during the rotative movement and periods of rest thereof; means to apply the leading end portion of a gummed web from a roll to the box on the box form support; said web being adapted to be wrapped around the box during the periods of movement thereof and severed at a predetermined point in the rotative movement of the support; and means to which the box on the form support is presented during the periods of rest of the latter to press the web against the sides and fold lateral portions of the web against the bottom and over the edge at the open end of the box.

22. In box covering apparatus, a box form support; a reciprocably supported carrier in which the support is rotatably mounted; means to intermittently rotate the support; means to reciprocate the carrier and support transversely of its axis of rotation during the rotative movements thereof; a gauge; a rectangular guide frame to co-operate with the gauge during the rotative and reciprocating movements of the box form support and relative to which said frame is positioned during the periods of rest; and means operative from the gauge to control the actuation of said carrier reciprocating means.

23. In box covering apparatus, a box form support; a reciprocably supported carrier in which the support is rotatably mounted; means to intermittently rotate the support; fluid actuated means to reciprocate the carrier and support transversely to the axis of rotation and during the rotative movements of the support; a gauge; a rectangular guide frame carried by and rotatable with the box form support to co-operate with said gauge during the rotative and reciprocating movements of the box form support and relative to which the frame is positioned during the periods of rest; and means actuated by said guide frame and forming a part of the gauge operative to control the fluid actuated carrier reciprocating means.

24. In box covering apparatus, a box form support; a reciprocably supported carrier in which the support is rotatably mounted; means to intermittently rotate the support; fluid actuated means to reciprocate the carrier and support transversely to the axis of rotation and during the rotative movements of the support; comprising a cylinder; a piston to reciprocate in the cylinder and connected to the carrier, valve controlled fluid inlets and outlets from the cylinder to opposite sides of the piston; a source of fluid pressure connected to the cylinder inlets; a gauge having a movable member connected to the control valves for the inlets and outlets from the cylinders; a guide frame carried by and rotatable with the box form support to co-operate with the movable member of the gauge to actuate the control valves for the cylinder inlets and outlets and relative to which gauge the frame is positioned during the periods of rest thereof.

25. In box covering apparatus, an intermittently rotatable box form support; means in which the support is rotatably mounted and operative to reciprocate the support transversely of its axis of rotation; a gauge; and a guide frame carried by and movable with the box form support, said frame being movable relative to the gauge to guide the support in its reciprocatory movements during the rotation thereof and adapted to be positioned relative to the gauge during the periods of rest.

26. In box covering apparatus, an intermittently rotatable support for box forms of variable sizes; means in which the support is rotatably mounted and operative to reciprocate the same transversely to its axis of rotation; a gauge; and a guide frame carried by the form support to participate in the rotative and reciprocatory movements thereof, said frame being movable relative to the gauge to guide the support in its reciprocatory movements during the rotation thereof and adapted to be positioned relative to the gauge during the periods of rest; and said frame being adjustable to accommodate the movements of the support to variable sizes of boxes to be covered.

27. In box covering apparatus, a support for box forms of variable sizes; means in which the support is rotatably mounted and to have reciprocatory movement transversely to its axis of rotation; a gauge; and a guide frame carried by and movable with the box form support, said frame being movable relative to the gauge to guide the support in its reciprocatory movements during the rotation thereof and adapted to be positioned relative to the gauge, and being adjustable to accommodate the movements of the support to variable sizes of boxes to be covered, and said frame comprising a bar fixed to the support axially thereof to extend diametrically opposite from the axis of the support, bars adjustably carried intermediate their ends by the opposite ends of the first bar to extend transversely thereof, and rollers to engage the gauge carried by said latter arms to have adjustment toward and away from the ends thereof.

28. In box covering apparatus, a support for box forms of variable sizes; means in which the support is rotatably mounted and to have reciprocatory movement transversely to its axis of rotation; a gauge; and a guide frame carried by and movable with the box form support; said frame being movable relative to the gauge to guide the support in its reciprocatory movements during the rotation thereof and adapted to be positioned relative to the gauge, said frame being adjustable to accommodate the movements of the support to variable sizes of boxes to be covered and comprising a slotted bar fixed to the support intermediate its ends to extend diametrically opposite from the axis of the support, slotted bars adjustably mounted intermediate their ends in the slots of the first bar to extend transversely thereof, and rollers to engage the gauge mounted in the slots of said latter bars to have adjustment toward and away from the ends thereof.

29. In box covering apparatus, an intermittently rotatable box form support; a box conveyer; means to move a box from the conveyer and position it on the box form on the support; means to guide a gummed web from a roll, position and apply the leading end portion to the side of a box on the form support during a period of rest of the latter, said web being adapted to be wrapped around the box during the rotation of the support; and means to which the box on the form is positioned during the periods of rest operative to press the web to a side of the box and fold the lateral portions of the web against the bottom and over the edge at the open end thereof.

30. In box covering apparatus, an intermittently rotatable box support; a box conveyor; means operative during a period of rest of the support to move a box laterally from the conveyer onto the support and hold the box on the support during a predetermined number of successive movements of the support; a supply roll for the covering web for the box; means for supporting the leading end portion of the web and applying the same to the side of the box on the support during the interim of moving the box from the conveyer to the support and the successive intermittent movement of the support, said web being withdrawn from the supply roll over the support therefor and wrapped around the box during the successive intermittent movements thereof with the box form support; and means to impart retractive movement to the means to move the box from the conveyor onto the support after a predetermined number of intermittent movements have been imparted to the support to move the box from the support to the conveyor.

31. In box covering apparatus, an intermittently rotatable box form support; a box conveyor; driving means; means to connect the box form support to said driving means to intermittently actuate the same and disconnect said support from the driving means after a predetermined number of movements have been imparted thereto; means operative during a period of rest of the support to move the box from the conveyor onto the form on the support, said means being set in operation by the movement of a box with the conveyor, and operative to hold the box on the support during a predetermined number of successive intermittent movements of the support; means to support the leading end of a covering web from a supply roll and apply the same to the box on the form during the interim of moving the box from the conveyer to the support and the successive intermittent movement of the support, said web being withdrawn from the supply roll over the support therefor and wrapped around the box during the successive intermittent movement of the box form support; and means operative from the driving means to impart retractive movement to the means to move the box from the conveyer onto the support after a predetermined number of intermittent movements have been imparted to the support to move a covered box from the support to the conveyer.

32. In box covering apparatus, an intermittently rotatable box form support, a box conveyer; means to move the box from the conveyer onto the form on the support; means to apply a covering web from a supply roll to the box on the form during the intermittent movements of the form support; and means to impart retractive movement to the means to move the box from the conveyer onto the box form after a predetermined number of intermittent movements have been imparted to the form support to move the covered box from the box form support to the conveyer.

33. In box covering apparatus, an intermittently rotatable box form support and around a box on which support a covering web is adapted to be wrapped during the intermittent movement thereof; a box conveyer; means to move a box from the conveyer onto the box form on the support and hold the box on the form during the intermittent movement of the support and the wrapping of the covering web around the box, and operative after a predetermined number of movements have been imparted to the support and the web wrapped around a box to move the box from the form on the support and return it to the conveyer.

34. In box covering apparatus, an intermittently rotatable box form support and around a box on which said support a covering web is adapted to be wrapped during the rotative movement thereof; a box conveyer movable in a plane transversely of the axis of the support; a head reciprocable in a direction transversely of the conveyer and axially of the support; means to actuate said head to move a box from the conveyer onto the form on the support and hold the box on the form during the rotary movements of the support and the wrapping of a covering web around the box; and means to impart retractive movement to said head actuating means after a predetermined number of movements have been imparted to the support and the web wrapped around the box to move the box from the form on the support and return it to the conveyer.

35. In box covering apparatus, an intermittently rotatable box form support and around a box on which support a covering web is adapted to be wrapped during the intermittent movement thereof; a box conveyer movable in a plane transversely of the axis of the support; a head reciprocable in a direction transversely of the conveyer and axially of the support; a suction cup rotatably carried by said head co-axially of the support; means to actuate said head to cause the suction cup to engage the bottom of the box on the conveyer and move it from the latter onto the box form on the support; said head being adapted to be positioned to hold the box on the form during the rotative movements of the support and the wrapping of the covering web around the box; and means operative from the actuating means for the support after a predetermined number of intermittent movements have been imparted to the support to impart retractive movement to the head, and the suction cup operative during said movement of the head to withdraw the covered box from the support and return it to the conveyer.

36. In box covering apparatus, an intermittently rotatable box form support and around a box on which support a covering web is adapted to be wrapped during the intermittent movement thereof; a box conveyer movable in a plane transversely of the axis of the support; a head reciprocable in a direction transversely of the conveyer and axially of the support; a suction cup rotatably carried by said head co-axially of the support; means to actuate said head to cause the suction cup to engage the bottom of the box on the conveyer and move it from the latter onto the box form on the support; said head being adapted to be positioned to hold the box on the form during tht intermittent rotative movements of the support and the wrapping of the covering web around the box; means operative from the actuating means for the support after a predetermined number of intermittent movements have been imparted to the support to impart retractive movement to the head and the suction cup operative during said movement of the head to withdraw the covered box from the support and return it to the conveyer; and means operative at the termination of the retractive movement of the head to destroy any vacuum in the space between the suction cup and box to release the suction cup from the box when positioned on the conveyer.

37. In box covering apparatus, an intermittently rotatable box form support and around a box on which support a covering web is adapted to be wrapped during the intermittent movement thereof; a box conveyer moving in a plane transversely to the axis of the support adapted to position a box relative to the support; a head reciprocable transversely of the conveyer and in a plane with the axis of the support; means to actuate said head to move a box from the conveyer positioned relative to the support onto the box form on the support and hold the same on the form during the intermittent movement of the support and the wrapping of the covering web around the box thereon; and means to actuate the head actuating means to impart retractive movement to the head after a predetermined number of movements have been imparted to the support and the covering web wrapped around the box to move the box from the support and reposition it on the conveyer; and means carried by the head adapted to be positioned between the box being moved from the conveyer to the box form on the support and the successive box on the conveyer to hold the latter against movement with the conveyer while a box is being covered on the support.

38. In box covering apparatus, an intermittently rotatable box form support and around a box on which support a covering web from a roll is adapted to be wrapped by and during the intermittent movements of the support; a box conveying belt movable in a plane transversely to the axis of the support; a stop engaged by a box on the conveyer to position the box relative to the support; a head reciprocable transversely of the conveyer and in a plane with the axis of the support; means set in operation by the stop as a box engages therewith to actuate said head to transfer the box from the conveyer onto the box form on the support and hold it on the form during the intermittent movements of the support; and means to actuate the head to impart retractive movement to the head to transfer the box from the support after a predetermined number of movements have been imparted to the support and the covering web wrapped around the box.

39. In box covering apparatus, an intermittently rotatable box form support and around a box on which support a covering web from a roll is adapted to be wrapped by and during the intermittent movements of the support; a box conveying belt movable in a plane transversely to the axis of the support; a stop engaged by a box on the conveyer to position the box relative to the support; a head reciprocable transversely of the conveyer and in a plane with the axis of the support; a rock shaft connected to said head; a shaft connected to the rock shaft urged in one direction under the influence of the tension of a spring to move the rock shaft and thereby the head in a direction to transfer a box from the conveyer onto the form on the support and hold the head in said position to retain the box on the form during the intermittent movements of the support, said shaft being adapted to be held in said position under the tension of its actuating spring; means operative from the stop as the box engages therewith to release said shaft; and means operative after a predetermined number of movements of the support to actuate the spring influenced shaft to actuate the rock shaft and impart retractive movement to the head to transfer a box from the support and reposition it upon the conveyer and simultaneously with said movement place the shaft under the tension of its actuating spring.

40. In box covering apparatus, an intermittently rotatable box form support and around a box on said support a covering web drawn from a roll is adapted to be wrapped by and during the intermittent movements of the support; a box conveying belt movable in a plane transversely to the axis of the support; a stop engaged by a box on the conveyer to position the box relative to the support; a head reciprocable transversely of the conveyer and in a plane with the axis of the support; a rock shaft connected to said head; a shaft connected to the rock shaft urged in one direction under the influence of the tension of a spring to move the rock shaft and thereby the head in a direction to transfer a box from the conveyer onto the form on the support and hold the head in said position to retain the box on the form during the intermittent movements of the support, said shaft being adapted to be held in said position under the tension of its actuating spring; means operative from the stop as the box engages therewith to release said shaft; a reciprocable rack; a pinion on the spring influenced shaft meshing with said rack; and a rotatable cam to co-operate with the rack to move the same after a predetermined number of movements have been imparted to the box from support to impart retractive movement to said spring influenced shaft and thereby actuate the rock shaft to impart retractive movement to the head to transfer the box from the form on the support to the conveyer and simultaneously place the actuating spring for the shaft under tension.

41. In box covering apparatus, the combination with the frame work, of a box form support; a carrier in which said support is rotatably mounted and reciprocable transversely of its axis of rotation during the rotative movement thereof; means to intermittently rotate the support and impart said reciprocable movement to its carrier; means to guide the support during its rotative and reciprocable movements and relative to which guide the support is positioned during the periods of rest; means to support the leading end portion of a web from a supply roll and apply the same to a box on the form on the support; said web being adapted to be drawn from the roll by the rotative movement of the box form support and wrapped around the box; a box conveyer movable in a plane transversely of the axis of the box support; a reciprocable head slidably carried by the carrier for the box form support to have movement transversely of the conveyer and in a plane with the axis of the box form support; means to actuate said head to transfer a box from the conveyer onto the box form support and return it to the conveyer after a predetermined number of movements have been imparted to the box form support and the web wrapped around the box thereon; and means to adjustably mount the carrier with the box form support, its guiding means and head and the conveyer supporting means on the framework whereby the conveyer and the carrier with the box form support, guiding means and head may have adjustment relative to each other to accommodate the same to covering boxes of different sizes.

42. In a box covering apparatus, a rotatable box form support; means to intermittently rotate said support; a movable support for the leading end portion of a gummed box covering web from a supply roll; means to move said support to position the end portion of the web relative to and apply the same to the side of the box on the form on the support and return the web support to initial position, said web being adapted to be drawn from the roll over the support and wrapped around the box on the form during the intermittent movement thereof; means to which the sides of the box are successively presented operative to press the web against a box side during the periods of rest of the support; a carrier for a pair of shear blades; means operative after a predetermined number of movements have been imparted to the box form support to position the shear carrier with the blades to straddle the web and operative in said position by the means to press the web against the side of the box to sever the web.

43. In a box covering apparatus, a rotatable box form support; means to intermittently rotate said support; a movable support for the leading end portion of a gummed box covering web from a supply roll; means to move said support to position the end portion of the web relative to and apply the same to the side of the box on the form on the support and return the web support to initial position, said web being adapted to be drawn from the roll over the support and wrapped around the box on the form during the intermittent movement thereof; a reciprocable wiper relative to which the sides of the box are successively presented during the periods of rest; means to actuate the wiper; a carrier for a pair of shear blades one movable relative to the other; means to actuate said carrier to position the same after a predetermined number of movements of the box form support with the web engaging between the blades; and means operative from the wiper actuating means to move the movable shear blade to sever the web.

44. In box covering apparatus, a rotatable box form support; means including a Geneva gear to intermittently rotate said support; a movable support for the leading end portion of a gummed box covering web from a supply roll; means operative from the Geneva gear to move the web support to position the end portion thereof adjacent the side of a box on the support; means carried by said web support operative during the movement thereof as it is positioned relative to the box on the support to apply the leading end of the web to the box; a wiper relative to which the sides of the box are successively positioned during the periods of rest; means to actuate said wiper to press the web against the side of a box; a rock shaft; a carrier on said rock shaft for a pair of shear blades one movable relative to the other; means operative from the Geneva gear after a predetermined number of movements have been imparted to the box support to rock the shaft to position the shear carrier with the blades straddling the web; and means operative from the wiper actuating means to move the one shear blade to sever the web.

45. In box covering apparatus, a rotatable box support; means including a Geneva gear to intermittently rotate said support;

means to apply the leading end portion of a gummed box covering web to the box; said web being adapted to be wrapped around the box during the rotation thereof; a wiper relative to which the sides of the box are successively presented during the periods of rest of the support; means to reciprocate said wiper to cause the same to press the web against a side of the box; a rock shaft; a carrier on said rock shaft; a pair of shear blades one mounted in fixed position on the carrier and the other slidable relative to the fixed blade; a cam rotatable with the Geneva gear operative after a predetermined number of movements have been imparted to the box support to rock the rock shaft to position the shear carrier with the shear blades straddling the covering web in predetermined position in relation to the box; and an actuator for the slidable shear blade relative to which the shear blades are positioned when moved to web straddling position and operable by the wiper to sever the web.

46. In box covering apparatus, a rotatable box support; means including a Geneva gear to intermittently rotate said support; means to apply the leading end portion of a gummed box covering web to the box; said web being adapted to be wrapped around the box during the rotation thereof; a wiper relative to which the side of the box are successively presented during the periods of rest of the support; means to reciprocate said wiper to cause the same to press the wiper against a side of the box; a rock shaft; a carrier on said rock shaft; a pair of shear blades one mounted in fixed position on the carrier and the other slidable relative to the fixed blade; and means to actuate said rock shaft to position the shear blades to straddle the covering web in predetermined relation to the box on the support, comprising a cam rotatable from the Geneva gear, a lever one arm of which carries a cam follower to co-operate with the cam, and a link to connect the other arm of the lever with the rock shaft; and means operative from the wiper to actuate the slidable shear blade to sever the web.

47. In box covering apparatus, a rotatable box support; means including a Geneva gear to intermittently rotate said support; means to apply the leading end portion of a gummed box covering web to the box; said web being adapted to be wrapped around the box during the rotation thereof; a wiper relative to which the sides of the box are successively presented during the periods of rest of the support; means to reciprocate said wiper to cause the same to press the web against the side of the box; a rock shaft; a carrier on said rock shaft; a pair of shear blades one mounted in fixed position on the carrier and the other slidable relative to the fixed blade; means operative from the Geneva gear to actuate the rock shaft to move the carrier to position the shear blades to straddle the covering web in predetermined relation to the box on the support, comprising a rock shaft, an arm on said shaft relative to which an abutment on the movable shear blade is positioned to be engaged by said arm when the shaft is rocked, a cam carried by said rock shaft, and a cam follower carried by the wiper reciprocating means adapted to co-operate with the cam at a predetermined point in the movement of said actuator to rock the shaft to move the shear blade actuator and slidable shear blade to sever the web.

48. In box covering apparatus, an intermittently rotatable box support; means to apply the leading end portion of a gummed covering web for the box from a supplying roll to the side of a box on the support, said web being adapted to be drawn from the roll and wrapped around the box by and during the intermittent movement of the the box support, and means relative to which a side of the box is positioned during the periods of rest of the support to press the web against a box, comprising a wiper, a reciprocable slide carrying said wiper, a rotatable disk, and a rod connected at one end to the wiper slide and at the other end to the disk eccentric to its axis of rotation, said connection of the rod and disk being adapted to be varied to adapt the movement of the wiper to different sides of boxes.

49. In box covering apparatus, an intermittently rotatable box support, means to apply the leading end portion of a gummed covering web for the box from a supplying roll to the side of a box on the support, said web being adapted to be drawn from the roll and wrapped around the box by and during the intermittent movement of the box support, and means relative to which a side of the box is positioned during the periods of rest of the support to press the web against a box, comprising a wiper, a reciprocable slide carrying said wiper, a rotatable disk, and means to connect the slide to the disk eccentric to its axis of rotation and adjust said connection to vary the movement of the wiper to adapt the same to boxes of different sizes.

50. In box covering apparatus, a rotatable box support; means including a Geneva gear to intermittently rotate the box support; a rotatably supported roll of covering web for the box, and means to support, guide and position and apply the leading end portion of the web to a side of the box during a period of rest of the box support, comprising a pivotally supported arm; a roller carried by said arm over which said web engages, means to engage the web on the roller to permit feeding movement of the web and hold the same against retrograde movement, means actuated by a cam movable with a member of the Geneva gear to actuate the roller carrying arm to move the roller carrying end of said arm with the web toward and away from the box on the support, and a presser lever pivotally carried by the roller carrying arm operative by means actuated by the movement of the roller carrying arm to move said presser lever toward and away from a box on the support.

51. In box covering apparatus, a rotatable box support; means including a Geneva gear to intermittently rotate the box support; a rotatably supported roll of covering web for the box and means to support, guide and position and apply the leading end portion of the web to a side of the box during a period of rest of the box support, comprising a pivotally supported arm, a roller carried by said arm over which said web engages; means to engage the web on the roller to permit feeding movement of the web and hold the same against retrograde movement, a cam rotatable with one of the members of the Geneva gear, a pivotally supported cam follower carrying arm connected to the roller carrying arm to move the roller carrying end of said arm with the web toward and away from the box on the support, and a presser lever pivotally carried by the roller carrying arm operative by the movement of the roller carrying arm to move said presser lever toward and away from the box on the support, said cam actuated arm being arranged to co-operate with the other member of the Geneva gear to hold the same against movement during the applying of the leading end of the web to the box.

52. In box covering apparatus, a rotatable box support; means including a Geneva gear to intermittently rotate the box support; a rotatably supported roll of covering web for the box and means to support, guide and position and apply the leading end portion of the web to a side of the box during a period of rest of the box support, comprising a pivotally supported arm; a roller carried by said arm over which said web engages, means to engage the web on the roller to permit feeding movement of the web and hold the same against retrograde movement, a cam rotatable with one of the members of the Geneva gear, a cam follower carrying arm pivotally supported at one end connected to the roller carrying arm to move the roller carrying end of said arm with the web toward and away from the box on the support, the other end of said cam follower carrying arm being arranged to co-operate with the other member of the Geneva gear to hold the same against movement during the movement of the roller carrying arm toward and away from the box on the support, a lever pivotally carried by the roller carrying arm carrying a presser head at one end, a link connected at one end to the other end of said lever and the other end of the link connected to a fixed part, said link being operative by the roller carrying arm as it is moved toward and away from the box on the support to cause the presser head carrying end of the lever to move toward the box on the support to press the leading end portion of the web against the same and move said head away from the box as the roller carrying arm is retracted.

53. In box covering apparatus, an intermittently rotatable box support; means to rotatably support a roll of covering web for the box; a gum carrying box arranged with a roller over which the web is passed as it is drawn from the roll to apply gum to one surface thereof; and means over which the leading end portion of the web is guided operative to position and apply the leading end portion of the web to a side of the box on the support during a period of rest thereof, and said web adapted to be drawn from the roll and wrapped around a box on the support during the movement of the latter.

54. In box covering apparatus, a rotatable box support; a box conveyer; means including a Geneva gear to intermittently rotate the box support; a driving shaft; a driven shaft on which one of the members of the Geneva gear is fixed; means to transfer a box from the conveyer to the box support and from the latter to the conveyor; means to disconnect the actuating means for the box support from the driving shaft during the period of movement of said means to transfer a box from the support to the conveyer and from the latter to the support; and means to connect the actuating means for the box support to the driving shaft when the box has been positioned on the support.

55. In box covering apparatus, a rotatable box support; a box conveyor; means including a Geneva gear to intermittently rotate the support; a driving shaft; a driven shaft on which one of the members of the Geneva gear is fixed; means to disconnect the driving shaft from the driven shaft after a predetermined number of movements have been imparted to the box support; means operative to transfer a box from the conveyer to the support and hold it on the support during the movement thereof by the Geneva gear; means operative after a predetermined number of movements have been imparted to the support to disconnect the driving shaft from the driven shaft and actuate the box transferring means to impart retractive movement to said means to transfer the box from the support and position it on the conveyor and transfer another box from the conveyor onto the support; and means actuated by said latter means as a box is transferred from the conveyor to the support to connect the driving shaft to the driven shaft.

56. In box covering apparatus, a rotatable box support; means to intermittently rotate said support; including a Geneva gear; a driving shaft; a driven shaft on which one member of the Geneva gear is fixed; a box conveyor; means to transfer a box from the conveyor to the support; actuated means therefor; means to apply the leading end portion of a covering web to a box on the support; said web being adapted to be wrapped around the box by the intermittent movement thereof and severed after a predetermined number of movements have been imparted to the support; a clutch operative to connect and disconnect the driving shaft with the driven shaft one clutch member being fixed to the driven shaft and the other rotatable with and slidable on the driving shaft; means operative from the Geneva gear to actuate said clutch to disconnect the shafts after a predetermined number of movements have been imparted to the support through the Geneva gear; a cam rotatable with the driving shaft to actuate means to operate the actuator for the means to transfer a box from the conveyor to the support to impart retractive movement thereto to transfer a covered box from the support to the conveyer; means operative from said actuator to release the clutch from its clutch disengaging means to permit the clutch to engage, and said engagement of the clutch releasing the cam from said actuator and a spring to impart movement to said actuator to actuate the means to transfer a box from the conveyor to the support.

57. In box carrying apparatus, a rotatable box support; means to intermittently rotate said support; including a Geneva gear; a driving shaft; a driven shaft on which one member of the Geneva gear is fixed; a box conveyor; means to transfer a box from the conveyor to the support including a spring influence shaft normally urged in a direction to move the box transferring means toward the support; means to apply the leading end portion of a covering web to a box on the support; said web being adapted to be wrapped around the box by the intermittent movement thereof and severed after a predetermined number of movements have been imparted to the support a clutch to couple and uncouple the driving and driven shafts, one clutch member being fixed to the driven shaft and the other member rotatable with and slidable on the driving shaft and normally urged to clutch engaging position by a spring; a clutch actuator for the sliding clutch member; means operative from the Geneva gear to actuate the clutch actuator to uncouple the shafts after a predetermined number of movements have been imparted to the support through the Geneva gear; a cam rotatable with the driving shaft and participate in the sliding movement of the clutch member thereon; means actuated by said cam when the shafts are uncoupled to rotate the shaft of the box transferring means in a direction against the tension of its actuating spring to operate the box transferring means to transfer a covered box from the support to the conveyor; and means to hold said shaft rotating means with the spring influenced shaft and box transferring means in position to transfer a box from the conveyor during a complete revolution of the cam and adapted to be positioned to release the shaft actuator by means engaged and actuated by a box on and movable with the conveyor, said spring influenced shaft of the box transferring means as its actuating means is released being moved under the influence of its spring to actuate the transferring means to transfer a box from the conveyor to the box support.

58. In box covering apparatus, a box form support; a box conveyor; means to transfer a box from the conveyor to the box support; means to apply a covering web to the box on the box support; and means operative after the covering web has been applied to the box to actuate the box transferring means to remove the box from the box support.

59. In box covering apparatus, an intermittently rotatable box form support, a gummed covering web for the box the leading end portion of which web is adapted to be applied to the box on the support; said web being of greater width than the depth of the box and wrapped around the box as the box is rotated with its support with lateral portions of the web extending beyond the bottom and open end of the box; and means operative during the periods of rest of the box support to press the covering web to the sides of the box and fold and extended lateral portions of the web against the bottom and over the edge at the open end of the box; and means to sever the web at a predetermined point in the rotative movement of the box with the box support.

60. In box covering apparatus, a box conveyor, means operative to wrap a covering web around a box; means set in operation by a box on the conveyor operable to transfer a box from the conveyor to said box wrapping means; and means operative after the box covering means has wrapped the covering web around the box to actuate the box transferring means to transfer the covered box from the wrapping means to the conveyor.

61. In box covering apparatus, a box conveyor, a rotatable box support means to wrap a covering web around a box on the support during the rotative movement thereof, and means set in operation by a box on the conveyor to transfer a box from the conveyor to said box wrapping means.

62. In box covering apparatus, a box form support; a box conveyor; means to transfer a box from the conveyor to the support, said box while on the form on the box support adapted to have a covering web wrapped around the sides thereof and portions of the web extending laterally beyond the bottom and open end of the box folded against the bottom and over the edge at the open end of the box, said box transferring means being operative to remove the covered box from the form on the support.

63. In box covering apparatus, a rotatable box form support; means to intermittently rotate said support and move the support transversely of its axis of rotation during the rotative movement thereof; a guide frame rotatable with said support; a gauge relative to which the guide frame is positioned during the periods of rest of the box support; a covering web adapted to be wrapped around the box during the rotative movement thereof with the support; and means to press the web wrapped around the box against the same and fold portions of the web extending laterally of the bottom and edge at the open end of the box against the bottom and over the edge at the open end thereof.

64. In box covering apparatus, a rotatable support for a box form; means to intermittently rotate said support; means to support and guide a box covering web and apply the leading end portion of the web relative to a box on the form on the support; said web being adapted to be wrapped around the box during the rotation of the box with the support; means relative to which the sides of the box are successively positioned operative to press the web to the sides of the box and fold lateral portions of the web extending beyond the bottom and edge at the open end of the box against the bottom and over the edge at the open end of the box, and means to sever the web after a predetermined portion thereof has been wrapped around the box.

65. In box covering apparatus, a box form support and around a box on which support a covering web is adapted to be wrapped with the web to extend beyond the bottom and open end of the box, and means to fold the extended web portions against the bottom and over the edge at the open end of the box, comprising a series of parallelly arranged fingers adjustable relative to and away from each other.

66. In box covering apparatus, a box support and around a box on which support a covering web is adapted to be wrapped, said web being of a width so that the lateral portions will extend beyond the bottom and open end of the box, and means to fold the extended web portions against the bottom and over the edge at the open end of the box, comprising resilient fingers, and a carrier on which said fingers are independently supported in parallel relation and to have adjustment relative to and away from each other.

Signed at city of New York, in the county of New York and State of New York, this 4th day of April, 1924.

ROBERT G. CLARK.